US011175959B2

(12) United States Patent
Gupta et al.

(10) Patent No.: US 11,175,959 B2
(45) Date of Patent: *Nov. 16, 2021

(54) DETERMINE A LOAD BALANCING MECHANISM FOR ALLOCATION OF SHARED RESOURCES IN A STORAGE SYSTEM BY TRAINING A MACHINE LEARNING MODULE BASED ON NUMBER OF I/O OPERATIONS

(71) Applicant: INTERNATIONAL BUSINESS MACHINES CORPORATION, Armonk, NY (US)

(72) Inventors: Lokesh M. Gupta, Tucson, AZ (US); Matthew R. Craig, Sahuarita, AZ (US); Beth Ann Peterson, Tucson, AZ (US); Kevin John Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/400,990

(22) Filed: May 1, 2019

(65) Prior Publication Data
US 2020/0348975 A1 Nov. 5, 2020

(51) Int. Cl.
*G06F 9/50* (2006.01)
*G06N 20/00* (2019.01)
*G06N 3/08* (2006.01)

(52) U.S. Cl.
CPC .......... *G06F 9/505* (2013.01); *G06F 9/5016* (2013.01); *G06N 3/084* (2013.01); *G06N 20/00* (2019.01)

(58) Field of Classification Search
None
See application file for complete search history.

(56) References Cited

U.S. PATENT DOCUMENTS 7,453,898 B1 * 11/2008 Cohen ................. H04L 47/521
370/414
9,710,194 B1   7/2017 Watson et al.
(Continued)

OTHER PUBLICATIONS

U.S. Appl. No. 16/400,985, filed May 1, 2019, 55 pp. [18.864 (Appln)].

(Continued)

*Primary Examiner* — Meng Ai T An
*Assistant Examiner* — Zujia Xu
(74) *Attorney, Agent, or Firm* — Konrad Raynes Davda & Victor LLP; Rabindranath Dutta

(57) ABSTRACT

A machine learning module receives inputs comprising attributes of a storage controller, wherein the attributes affect allocation of a plurality of resources to a plurality of interfaces. In response to a predetermined number of I/O operations occurring in the storage controller, a generation is made via forward propagation through a plurality of layers of the machine learning module, of an output value corresponding to a number of resources to allocate to an interface. A margin of error is calculated based on comparing the generated output value to an expected output value that is generated from an indication of a predetermined function based at least on a number of I/O operations that are waiting for a resource and a number of available resources. An adjustment is made of weights of links that interconnect nodes of the plurality of layers via back propagation, to reduce the margin of error.

19 Claims, 20 Drawing Sheets

(56) References Cited

U.S. PATENT DOCUMENTS

| | | | |
|---|---|---|---|
| 10,735,527 B1* | 8/2020 | Ge | H04L 67/22 |
| 2004/0260748 A1* | 12/2004 | Springer, Sr. | H04L 47/39 |
| | | | 709/200 |
| 2008/0154817 A1* | 6/2008 | Tesauro | G06K 9/6215 |
| | | | 706/17 |
| 2009/0174866 A1* | 7/2009 | Okada | G03B 21/206 |
| | | | 353/52 |
| 2016/0092136 A1 | 3/2016 | Balakrishnan et al. | |
| 2016/0224363 A1 | 8/2016 | Joy | |
| 2017/0126792 A1* | 5/2017 | Halpern | G06F 9/5061 |
| 2017/0147248 A1 | 5/2017 | Chitti et al. | |
| 2017/0168908 A1* | 6/2017 | Abali | G06F 11/2069 |
| 2017/0344265 A1* | 11/2017 | Ash | G06F 3/0611 |
| 2018/0052755 A1* | 2/2018 | Suzuki | G06F 11/3419 |
| 2018/0129892 A1* | 5/2018 | Bahl | G06K 9/00993 |
| 2019/0108338 A1* | 4/2019 | Saxe | G06F 21/565 |
| 2019/0236439 A1* | 8/2019 | D | G06F 9/5027 |
| 2020/0210430 A1* | 7/2020 | Shen | G06F 16/2456 |
| 2020/0285939 A1* | 9/2020 | Baker | G06N 3/04 |

OTHER PUBLICATIONS

List of IBM Patents or Patent Applications Treated as Related, May 1, 2019, 2 pp. [18.869 (Appendix P)].

Office Action dated Feb. 4, 2021, pp. 38, for U.S. Appl. No. 16/400,985, (18.864).

Response dated May 4, 2021, pp. 13, to Office Action dated Feb. 4, 2021, pp. 38, for U.S. Appl. No. 16/400,985, (18.864).

Notice of Allowance dated Aug. 9, 2021, pp. 24, U.S. Appl. No. 16/400,985.

* cited by examiner

DETERMINE A LOAD BALANCING MECHANISM FOR ALLOCATION OF SHARED RESOURCES IN A STORAGE SYSTEM BY TRAINING A MACHINE LEARNING MODULE BASED ON NUMBER OF I/O OPERATIONS

BACKGROUND

1. Field

Embodiments relate to the determination of a load balancing mechanism for shared resources in a storage system by training a machine learning module.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts. A plurality of such storage controllers, hosts, and other computational devices may be deployed at one or more sites to provide an environment for storage and management of data and also to provide an environment for data processing.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. Host bus adapters operate as interfaces between the storage controller and host computational devices, and storage adapters operate as interfaces between the storage controller and storage devices.

Artificial neural networks (also referred to as neural networks) are computing systems that may have been inspired by the biological neural networks that constitute animal brains. Neural networks may be configured to use a feedback mechanism to learn to perform certain computational tasks. Neural networks are a type of machine learning mechanism.

SUMMARY OF THE PREFERRED EMBODIMENTS

Provided are a method, system, and computer program product in which a machine learning module receives inputs comprising attributes of a storage controller, wherein the attributes affect allocation of a plurality of resources to a plurality of interfaces in the storage controller. In response to a predetermined number of I/O operations occurring in the storage controller, a generation is made via forward propagation through a plurality of layers of the machine learning module, of an output value corresponding to a number of resources to allocate to an interface of the plurality of interfaces in the storage controller. A margin of error is calculated based on comparing the generated output value to an expected output value, wherein the expected output value is generated from an indication of a predetermined function based at least on a number of I/O operations that are waiting for a resource and a number of available resources. An adjustment is made of weights of links that interconnect nodes of the plurality of layers via back propagation to reduce the margin of error, to improve a determination of the number of resources to allocate to the interface.

In additional embodiments, an improvement is made over a period of time, of the determination of the number of resources to allocate to the interface, by repeatedly adjusting the weights of the links via back propagation, in response to an occurrence of the predetermined number of I/O operations subsequent to a previous adjustment of the weights of the links via back propagation.

In certain embodiments, the plurality of interfaces comprise a plurality of ports of a host bus adapter that communicatively couples the storage controller to a host computational device; and the plurality of resources comprise a plurality of task control blocks (TCB) for executing a plurality of input/output (I/O) operations that are received by the host bus adapter from the host computational device.

In further embodiments, the interface is a port of the plurality of ports, wherein: if the output value is N, and if a number of I/O operations queued in a local queue of the port is M, and if the number of free TCBs local to the port is zero, then the expected output is N+M.

In additional embodiments, the interface is a port of the plurality of ports, wherein: if the output value is N, and if a number of I/O operations queued in a local queue of the port is zero, and the number of free TCBs local to the port is M, then the expected output is N−M.

In yet additional embodiments, the interface is a port of the plurality of ports, wherein: if the output value is N, and if a number of I/O operations queued in a global queue for the plurality of ports is Y, and the number of free TCBs in a global list of free TCBs for the plurality of is X, then the expected output is N−Y+X.

In certain embodiments the plurality of attributes includes: a measure of a total number of I/O operations currently active in the host bus adapter; a measure of total number of I/O operations currently active on the port; a measure of a total number of rejected I/O operations in the host bus adapter; a measure of a total number of rejected I/O operations from the port; a measure of an average response time for I/O operations; a measure of a current queue length on the port; a measure of a current number of dedicated TCBs on the port; and a measure of a current number of shared TCBs in the host bus adapter.

In further embodiments, the plurality of attributes includes: a measure of a peak number of I/O operations in the host bus adapter; a measure of an average number of I/O operations in the host bus adapter; a measure of a median number of I/O operations in the host bus adapter; a measure of a number of high priority I/O requests rejected from the host bus adapter, wherein high priority I/O requests are expected to be processed faster than low priority I/O requests; a measure of a number of high priority requests active in the host bus adapter; and a measure of a number of connections from the host computational device to the host bus adapter.

In yet further embodiments, the machine learning module is a neural network, wherein the plurality of layers comprises: an input layer that receives the inputs comprising the attributes of the storage controller; one or more hidden layers; and an output layer that outputs the output value, wherein operations further comprise: assigning, initial weights in the neural network based on estimates; and adjusting the weights of the links in the neural network, during a training of the neural network, in response to a predetermined number of operations occurring in the storage controller.

In certain embodiments, the machine learning module executes in a central computing device that generates weights to be applied to machine learning modules of a plurality of storage controllers in which a plurality of failures occur, wherein the machine learning module executing in the central computing device receives information from the machine learning modules of the plurality of storage controllers.

BRIEF DESCRIPTION OF THE DRAWINGS

Referring now to the drawings in which like reference numbers represent corresponding parts throughout.

DETAILED DESCRIPTION

Figure 1:
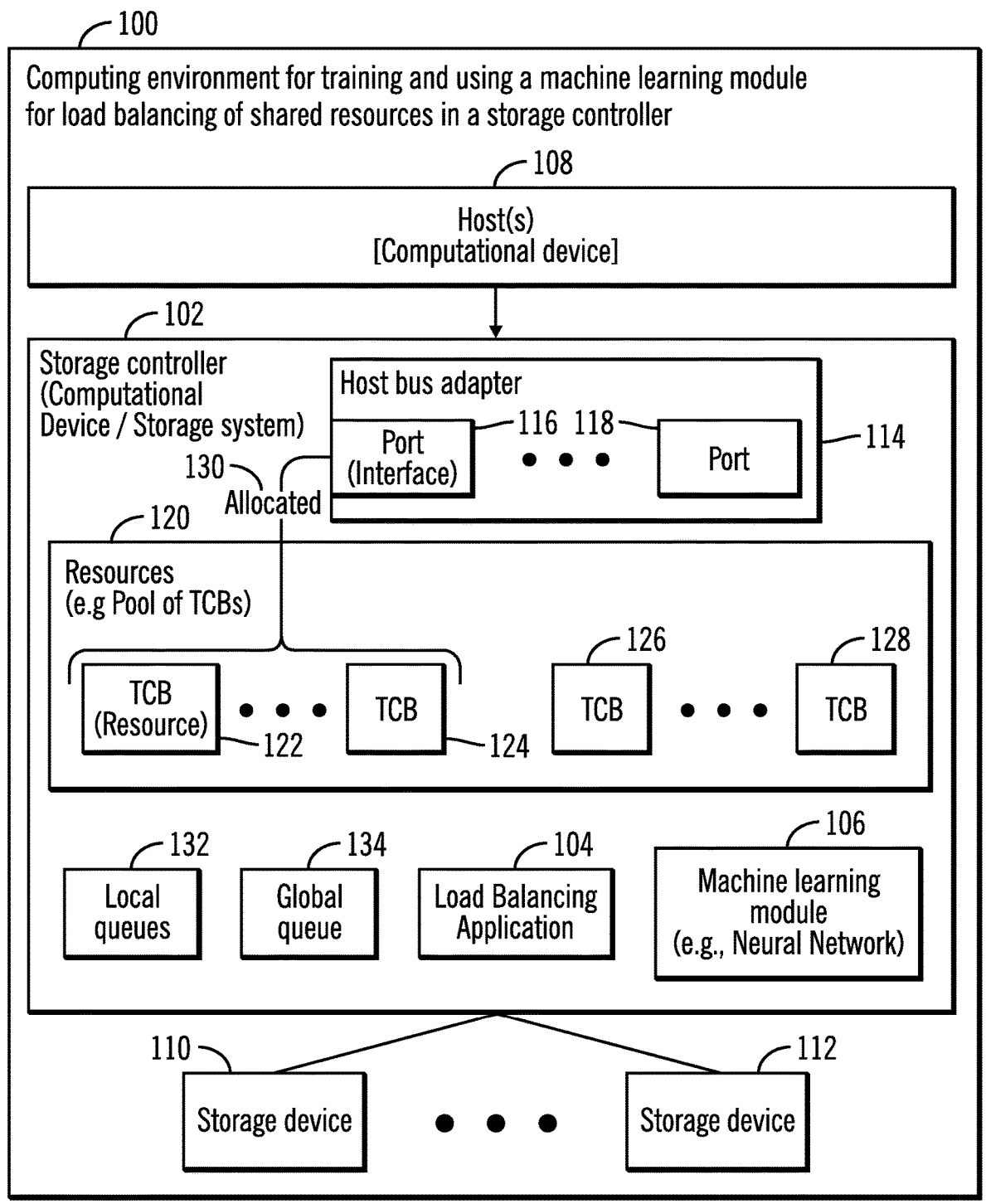
FIG. 1 illustrates a block diagram of a computing environment for training and using a machine learning module for load balancing of shared resources in a storage controller, in accordance with certain embodiments.

In the following description, reference is made to the accompanying drawings which form a part hereof and which illustrate several embodiments. It is understood that other embodiments may be utilized and structural and operational changes may be made.

Resources may have to be allocated for performing various tasks associated with interfaces in a storage controller that controls access to one or more storage devices and allows one or more host computational devices to access data stored in the one or more storage devices. The term resources as used in this disclosure is used to encompass any type of entity that may be allocated for performing one or more tasks in an interface of a computational device (e.g., a storage controller), and the term interface may include any device or component of the computational device. For example, a task control block (TCB) is a resource, wherein the TCB may be a data structure in the operating system kernel that includes the information needed to manage the scheduling and operation of a particular task. The TCB stores many different items of data that are needed for correct and efficient task management. TCBs may be allocated for performing tasks like I/O operations that are performed via ports of a host bus adapter that communicatively couples the storage controller to a host computational device, where the ports and the host bus adapter may comprise interfaces for the storage controller.

A host bus adapter may have many ports. A port may have a number of TCBs allocated for performing I/O operations. When an I/O request is received by the port then those allocated TCBs are used to service the I/O request. If the port runs out of TCBs to service those I/O requests then requests are queued till a TCB is freed up. Certain mechanisms for the allocation of TCBs to ports use a primarily static allocation in which each port has set of dedicated TCBs and the remaining TCBs are shared. Shared TCBs are moved to different ports based on the need for TCBs. A problem with the above mechanisms is that the mechanisms do not take into account a lot of factors which leads to some ports having an excessive number of TCBs with not much I/O being performed, and some ports having an excess of I/O requests that are queued. Such mechanisms may also lack the ability to predict when a port is likely to run out of TCBs.

In certain embodiments, a machine learning module is used to determine the best allocation mechanism for resources to a component, device, or interface for performing one or more tasks in a storage controller. In certain embodiments, the machine learning module is a neural network. The neural network may be used for error analysis where numerous inputs are available and various allocation of resources are available, to determine the optimal allocation to resources. The neural network may be continually trained via adjustment of weights and biases within the neural network to improve the predictive accuracy of determining the best allocation of resources. As a result of determining the best allocation mechanism of resources, improvements are made to the operations of one or more storage controllers.

In certain embodiments, a method and system and computer program product are provided for utilizing a neural network and machine learning mechanisms for improving the performance of a host interface (e.g., a host bus adapter) of a storage subsystem by dynamically allocating TCBs to each port of the host interface. In certain embodiments, an optimal number of resources (TCBs) are calculated to allocate to each port of the host bus adapter based on a plurality of input factors. Adjustments are made to the number of resources to allocate to each port based on I/O queues and the availability or non-availability of resources. The embodiments dynamically allocate TCBs to each port by utilizing a machine learning module.

Exemplary Embodiments

FIG. 1 illustrates a block diagram of a computing environment 100 for training and using a machine learning module for load balancing of shared resources in a storage controller, in accordance with certain embodiments. The computing environment 100 comprises a storage controller 102 in which a load balancing application 104 and a machine learning module 106 are implemented, in accordance with certain embodiments.

The storage controller 102 is configured to receive input/output (I/O) requests from the host computational devices 108 and provide access to a plurality of storage devices 110, 112 that are present in the computing environment 100. The storage controller 102 allows the one or more hosts computing devices 108 to perform input/output (I/O) operations with logical storage maintained by the storage controller 102. The physical storage corresponding to the logical storage may be found in one or more of the storage devices 110, 112 and/or a cache of the storage controllers 102.

The storage controller 102 and the host computational devices 108 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The storage controller 102, the host computational devices 108, and the storage devices 110, 112 may be elements in any suitable network, such as, a storage area network, a wide area network, the Internet, an intranet, etc. In certain embodiments, the storage controller 102, the host computational devices 108, and the storage devices 110, 112 may be elements in a cloud computing environment.

The plurality of storage devices 110, 112 may be comprised of any storage devices known in the art, such as solid state drives (SSD), hard disk drives (HDD), etc., that may be configured as a Redundant Array of Independent Disks (RAID).

In certain embodiments, the load balancing application 104 and the machine learning module 106 may be implemented in software, hardware, firmware or any combination thereof. The load balancing application 104 uses the machine learning module 106 to determine the optimal allocation of resources to interfaces in the storage controller.

In certain embodiments, the machine learning module 106 may implement a machine learning technique such as decision tree learning, association rule learning, neural network, inductive programming logic, support vector machines, Bayesian models, etc. In certain embodiments, the machine learning module 106 is a neural network implemented in the storage controller 102 or in some other computational device that receives failure data and other information related to the storage controller 102.

A host bus adapter 114 is an interface that communicatively couples the storage controller to a host 108, where the host bus adapter 114 may include a plurality of ports 116, 118. I/O requests from the host 108 are received are processed via the ports 116, 118 of the host bus adapter 114. The ports 116, 118 and the host bus adapter 114 are interfaces of the storage controller.

A pool of resources 120, such as a plurality of TCBs 122, 124, 126, 128 may be available for allocation to the plurality of ports 116, 118. In FIG. 1, reference numeral 130 shows that a plurality of TCBs 122, 124 are allocated to the port 116 for processing and managing I/O requests.

A local queue 132 may be maintained for each port of the host bus adapter 114, where the local queue 132 maintains the I/O requests that are waiting for being processed by the port. A global queue 134 of I/O requests that are waiting for being processed by any of the ports of the host bus adapter 114 is also maintained.

Therefore, FIG. 1 illustrates certain embodiments in which a machine learning module 106 is used by a load balancing application 104 to determine the optimal allocation of TCBs 122, 124, 126, 128 to ports 116, 118 of the storage controller 102.

Figure 2:
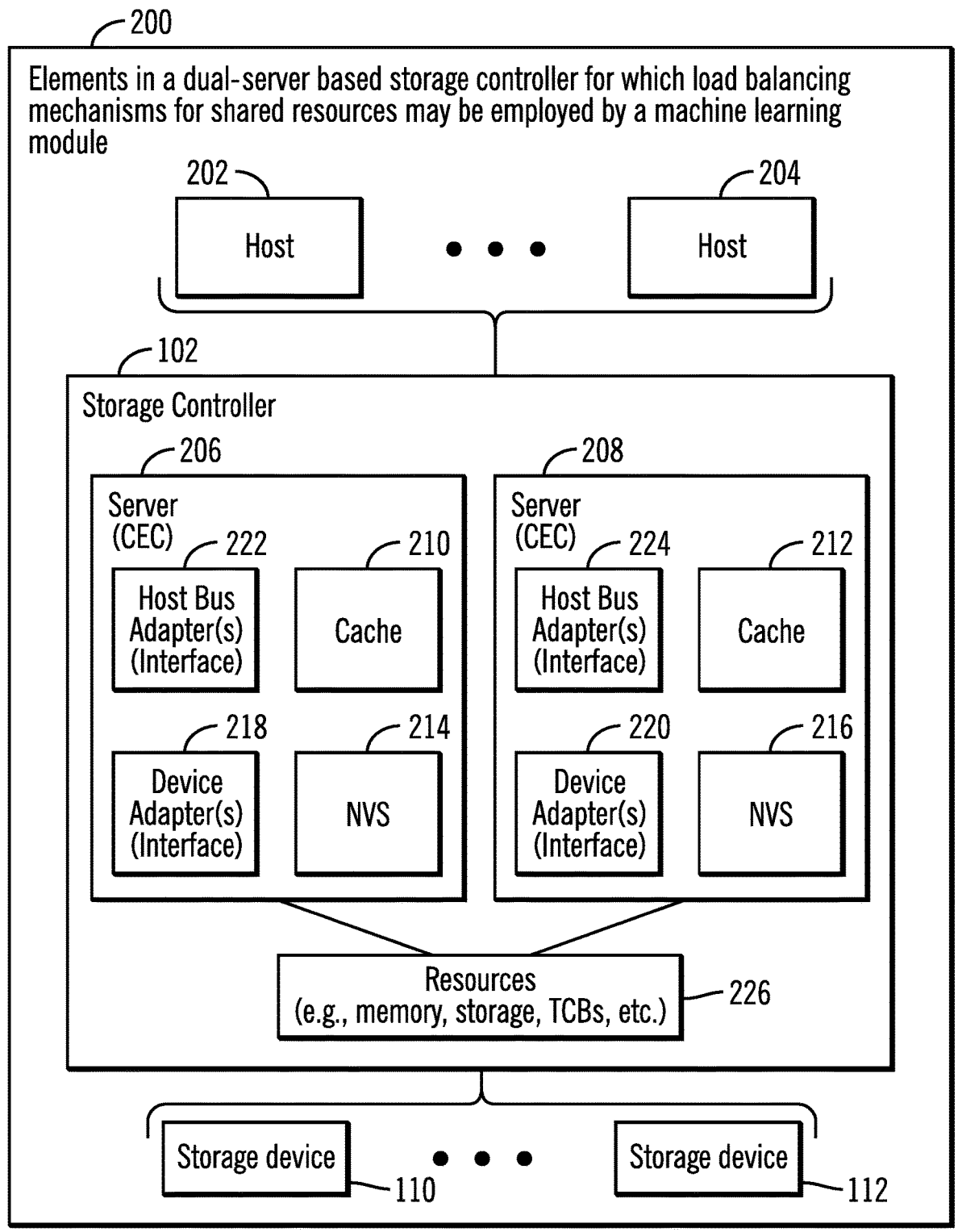
FIG. 2 illustrates a block diagram that shows elements in a dual-server based storage controller in which load balancing of shared resources are determined by a machine learning module, in accordance with certain embodiments.

FIG. 2 illustrates a block diagram 200 that shows additional elements in the storage controller 102 whose optimal allocation of resources are determined by the machine learning module 106, in accordance with certain embodiments.

The storage controller 102 is coupled to a plurality of hosts 202, 204 (corresponds to the hosts 108 shown in FIG. 1) and a plurality of storage devices 110, 112. The storage controller 102 has two servers 206, 208, which are referred to as central processor complexes (CPC). The CPC is also known as the processor complex or the internal server. Both servers 206, 208 share the system workload of the storage controller 102. The servers 206, 208 are redundant, and either server can fail over to the other server if a failure occurs, or for scheduled maintenance or upgrade tasks.

Each server may include a cache which is a volatile memory that is used as a read and write cache. For example, cache 210 is included in server 206 and cache 212 is included in server 208. Each server may also include a non-volatile storage (NVS) that is used to maintain and back up a second copy of the cache. For example, NVS 214 is included in server 206 and NVS 216 is included in server 208. If power is lost, batteries keep the storage controller 102 running until all data in NVS is written to internal storage of the storage controller 102. For processing host data, the storage controller 102 tries to maintain two copies of the data while the data moves through the storage controller 102. The cache and NVS of each server are used for holding host data.

When a write is sent to a storage volume and both the servers 206, 208 are operational, the write data is placed into the cache of the owning server for the write (e.g., server 206) and into the NVS of the other server (e.g., server 208). The NVS copy of the write data is accessed from the other server only if a write failure occurs and the cache of the owning server is empty or possibly invalid. Otherwise, the NVS copy of the write data in the other server is discarded after the destage from cache of the owning server to the storage devices 110,112 is complete. In certain embodiments, the cache 210 of server 206 is used for all logical volumes that are members of even logical subsystems (LSS), and the cache 212 of server 208 is used for all logical volumes that are members of odd logical subsystems, where the logical subsystems are numbered consecutively.

In certain embodiments, a plurality of device adapters 218, 220 may provide an interface between the storage controller 102 and the plurality of storage devices 110, 112. A plurality of host bus adapters 222, 224 may provide an interface between the storage controller 102 and the plurality of hosts 202, 204. In FIG. 2, the device adapter 218 and the host bus adapter 222 are included in server 206, and the device adapter 220 and host bus adapter 224 are included in server 208.

Task control block or other resources may be used for any of the interfaces such as ports of the host bus adapter and/or ports of the device adapters 218, or any other interface of the storage controller 102. The resources 226 used by the interfaces may include memory, storage, TCBs or any other type of resource. Thus the embodiments are not limited to TCBs and ports of host bus adapters, and may encompass any types of resources and interfaces of the storage controller 102.

Figure 3:
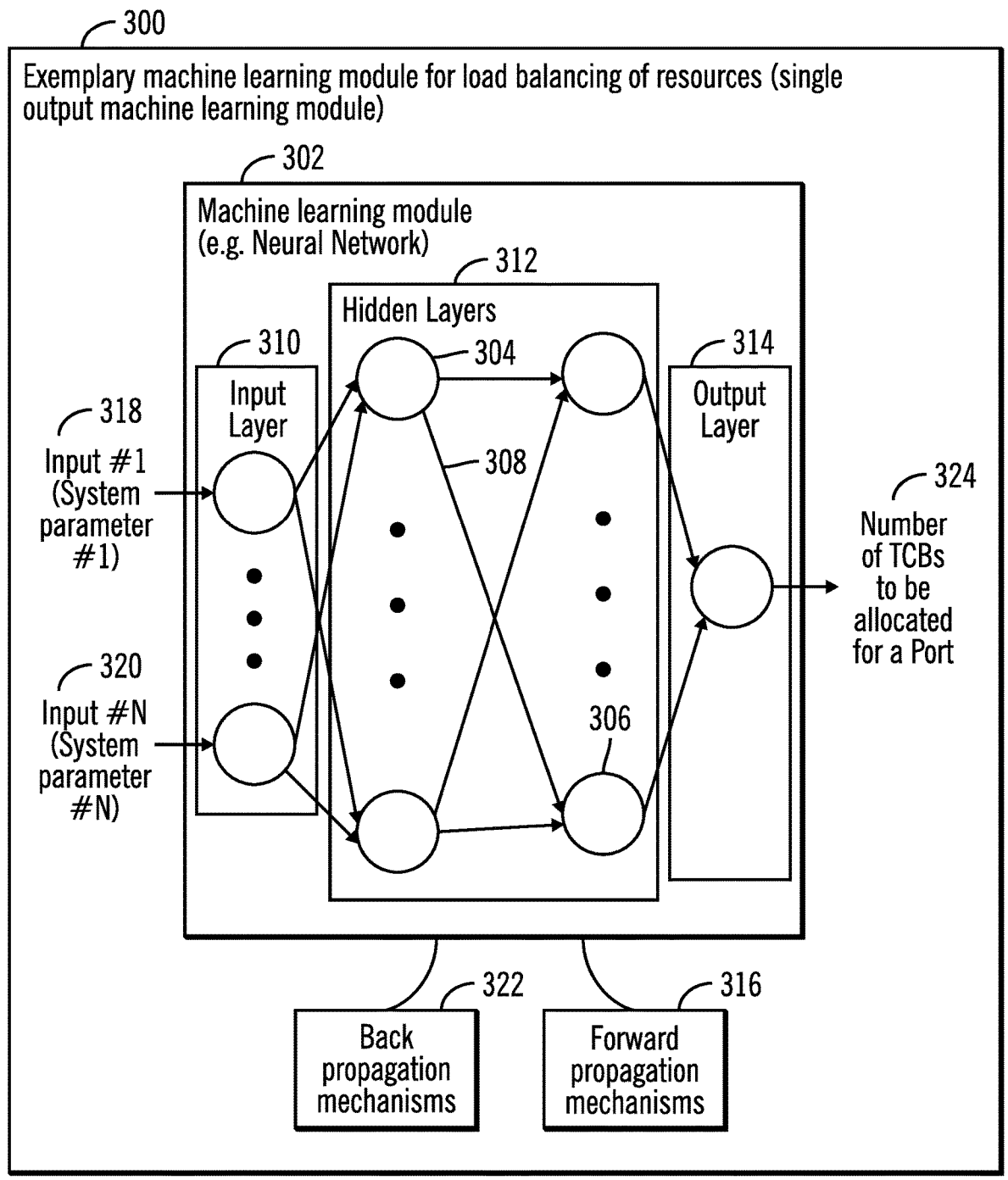
FIG. 3 illustrates a block diagram that shows a single-output machine learning module for load balancing of resources, in accordance with certain embodiments.

FIG. 3 illustrates a block diagram 300 that shows a machine learning module 302 (corresponds to machine learning module 106 shown in FIG. 1) for determination of optimal resource allocation for interfaces, in accordance with certain embodiments. The block diagram 300 shows that the machine learning module 106 comprises a single-output neural network 302.

The neural network 302 may comprise a collection of nodes with links connecting them, where the links are referred to as connections. For example, FIG. 3 shows a node 304 connected by a connection 308 to the node 306. The collection of nodes may be organized into three main parts: an input layer 310, one or more hidden layers, 312 and an output layer 314.

The connection between one node and another is represented by a number called a weight, where the weight may be either positive (if one node excites another) or negative (if one node suppresses or inhibits another). Training the neural network 302 entails calibrating the weights in the neural network 302 via mechanisms referred to as forward propagation 316 and back propagation 322. Bias nodes that are not connected to any previous layer may also be maintained in the neural network 302. A bias is an extra input of 1 with a weight attached to it for a node.

In forward propagation 316, a set of weights are applied to the input data 318, 320 to calculate an output 324. For the first forward propagation, the set of weights are selected randomly. In back propagation 322 a measurement is made the margin of error of the output 324 and the weights are adjusted to decrease the error. Back propagation 322 compares the output that the neural network 302 produces with the output that the neural network 302 was meant to produce, and uses the difference between them to modify the weights of the connections between the nodes of the neural network 302, starting from the output layer 314 through the hidden layers 312 to the input layer 310, i.e., going backward in the neural network 302. In time, back propagation 322 causes the neural network 302 to learn, reducing the difference between actual and intended output to the point where the two exactly coincide. Thus, the neural network 302 is configured to repeat both forward and back propagation until the weights (and potentially the biases) of the neural network 302 are calibrated to accurately predict an output.

In certain embodiments, the machine learning module 106 may be implemented in software, firmware, hardware or any combination thereof. For example, in one embodiment the machine learning module 106 may be implemented only in software, whereas in another embodiment the machine learning module 106 may be implemented in a combination of software, firmware, and hardware. In one embodiment, each node of the machine learning module 106 may be a lightweight hardware processor (e.g., a 1-bit processor) and there may be hardwired connections among the lightweight hardware processors. Software and/or firmware may implement the adjustment of weights of the links via adjustments in signals propagated via the hardwired connections.

In certain embodiments, the plurality of inputs 318, 320 comprise a plurality of system parameters of the computing environment 100. The single output 324 may provide an indication of the optimal number of TCBs to be allocated to a port of the host bus adapter in the storage controller 102.

In certain embodiments, the machine learning module 302 is trained to improve the determination of the optimal number of TCBs for a port in the storage controller 102. The training continuously improves the predictive ability of the machine learning module 302 over time. The single-output machine learning module 302 may have to be executed for each port of the host bus adapter 114.

Figure 4:
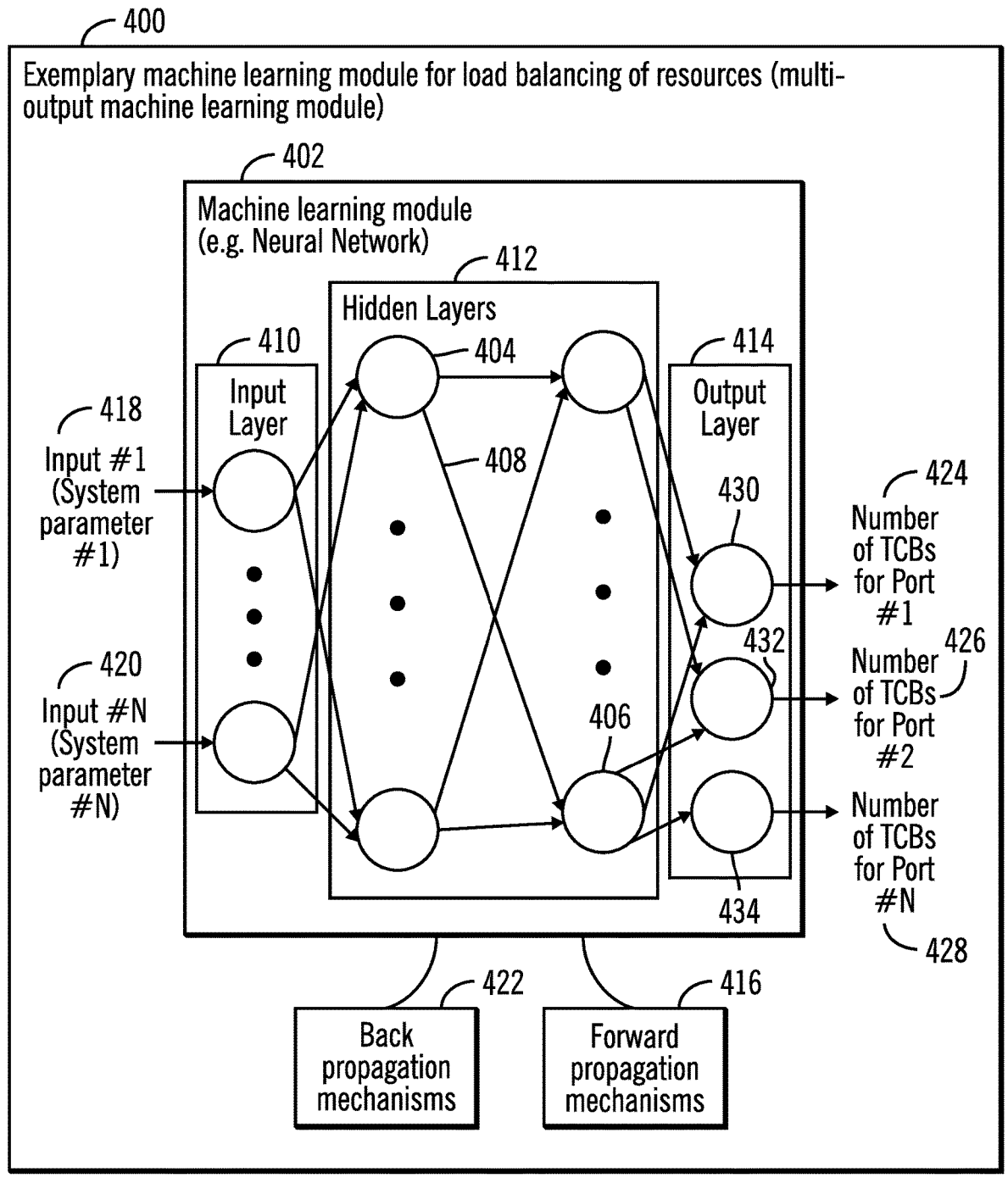
FIG. 4 illustrates a block diagram that shows a multi-output machine learning module for load balancing of resources, in accordance with certain embodiments.

FIG. 4 illustrates a block diagram 400 that shows a machine learning module 402 (corresponds to machine learning module 106 shown in FIG. 1) for determination of optimal resource allocation for interfaces, in accordance with certain embodiments. The block diagram 400 shows that the machine learning module 106 comprises a multi-output neural network 402 that may determine the optimal number of TCBs for each of plurality of ports simultaneously (as shown via reference numerals 424, 426, 428). Reference numerals 404, 406, 408, 410, 412, 414, 416, 418, 420, 422, 424 shows components, inputs and mechanisms similar to that shown in FIG. 3 but these components, inputs and mechanisms are designed for the multi-output machine learning module 402.

In contrast to FIG. 3, in which the optimal allocation of TCBs for each port are calculated separately, in the multi-output machine learning module 402 of FIG. 4, outputs may be generated simultaneously for multiple ports by many different mechanisms. The output layer 414 may have a plurality of nodes 430. 432, 434 that generate the optimal allocation of the number of TCBs of a plurality of ports of a host bus adapter simultaneously (as shown via reference numerals 424, 426, 428).

Figure 5:
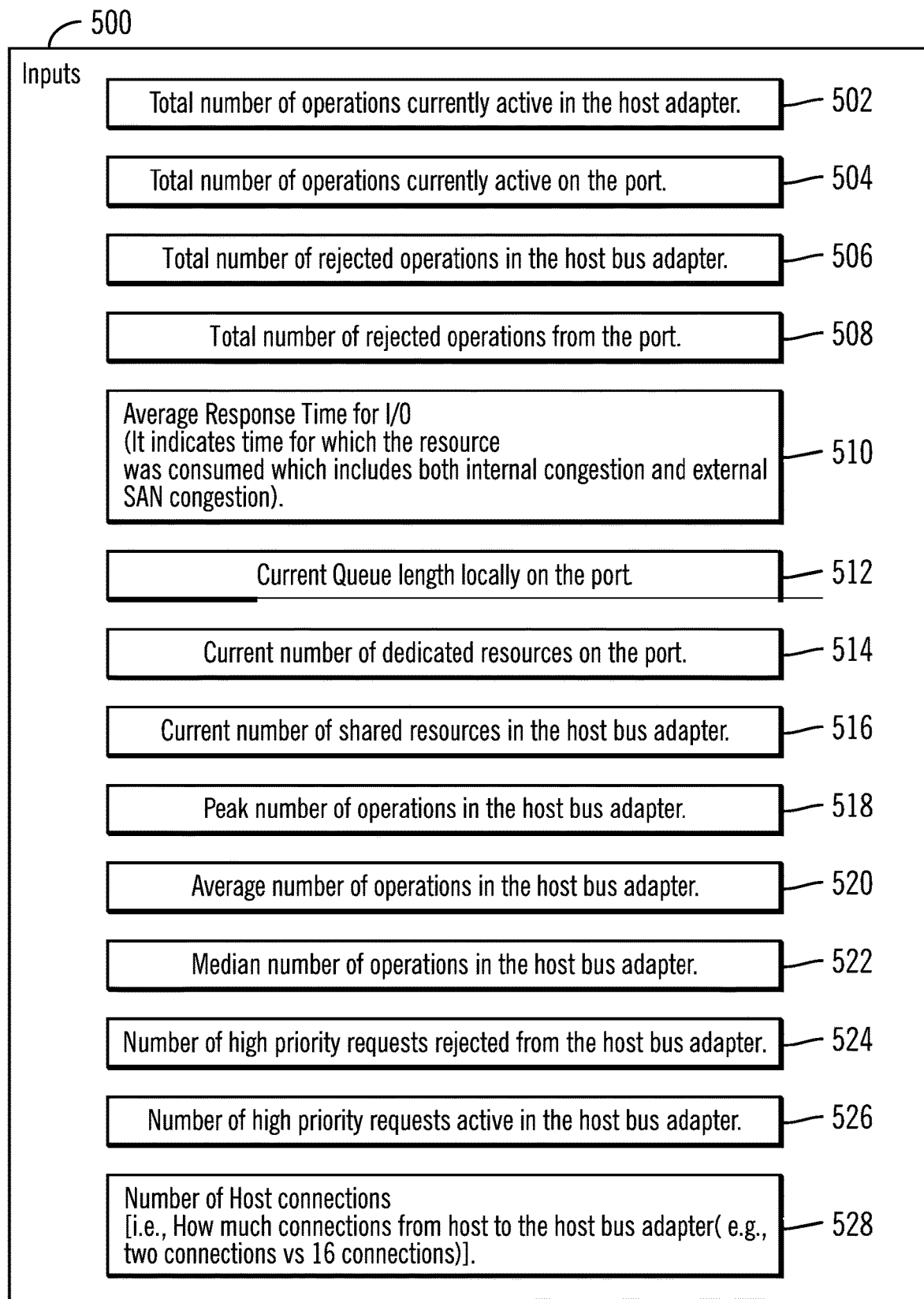
FIG. 5 illustrates a block diagram that shows exemplary inputs to the machine learning module, in accordance with certain embodiments.

FIG. 5 illustrates a block diagram that shows exemplary inputs 500 to the machine learning module 106, in accordance with certain embodiments. The exemplary inputs 500 are inputs that may affect the determination of the optimal number of TCBs to use for ports of a host bus adapter 114 in the storage controller 102.

In certain embodiments the exemplary inputs may be indicative of the following:
(1) Total number of operations currently active: Total number of operations currently active in the host bus adapter. [shown via reference numeral 502];
(2 Number of operations currently active on the port: Total number of operations currently active on the port. [Shown via reference numeral 504];
(3) Total number of operations rejected: Total number of rejected operations in the host bus adapter. [Shown via reference numeral 506];
(5) Number of operations rejected from the port: Total number of rejected operations from the port. [Shown via reference numeral 508];
(5) Average response time for I/O: Average response time for the I/O operation. It indicates time for which the resource was consumed, where the time includes both internal congestion and external storage area network (SAN) congestion. [Shown via reference numeral 510];
(6) Current queue length locally: Current queue length on the port. [Shown via reference numeral 512];
(7) Current number of dedicated resources: Current number of dedicated resources on the port. [Shown via reference numeral 514];
(8) Current number of shared resources: Current number of shared resources in the host adapter. [Shown via reference numeral 516];
(9) Peak number of operations: Peak number of operations in the host adapter. [Shown via reference numeral 518];
(10) Average number of operations: Average number of operations in the host bus adapter. [Shown via reference numeral 520];
(11) Median number of operations: Median number of operations in the host bus adapter. [Shown via reference numeral 522];
(12) Number of high priority rejected: Number of high priority requests rejected from the host bus adapter. [Shown via reference numeral 524];
(13) Number of high priority active: Number of high priority requests active in the host bus adapter. [Shown via reference numeral 526];
(15) Number of host connections: How much connections from host to the host bus adapter (e.g. two connections vs 16 connections) [shown via reference numeral 528];

It should be noted that many other inputs that affect the selection of the best recovery mechanism may be included beyond those shown in FIG. 5. Many additional types of inputs may be applied to the machine learning module comprising a neural network 106.

Figure 6:
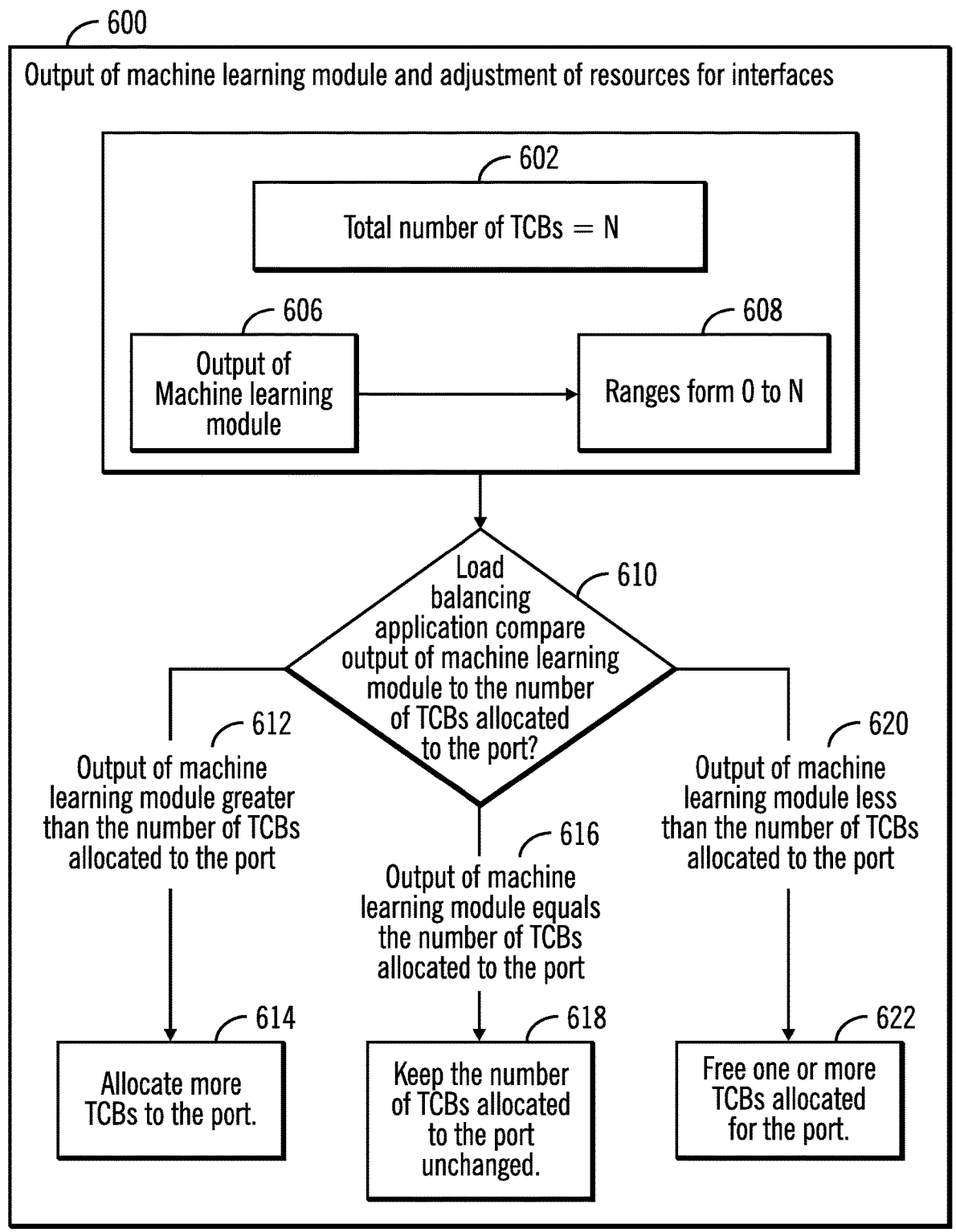
FIG. 6 illustrates a block diagram that shows an exemplary output of the machine learning module and the adjustment of resources for interfaces, in accordance with certain embodiments.

FIG. 6 illustrates a block diagram 600 that shows an exemplary output of the machine learning module 106 and the adjustment of resources for interfaces, in accordance with certain embodiments.

In certain embodiments the total number of TCBs are N (where N is a natural number), and the output 606 of the machine learning module 106 ranges from 0 to N indicating the number of TCBs to allocate to a port.

The load balancing application 104 compares the output of the machine learning module to the number of TCBs allocated to the port (at block 610). If the output of the machine learning module 106 is greater than the number of TCBs allocated to the port (reference numeral 612), then the load balancing application 104 allocates more TCBs to the port to increase the number of TCBs allocated to the port to equal the output of the machine learning module (reference numeral 614).

If the output of the machine learning module 106 is equal to the number of TCBs allocated to the port (reference numeral 616), then the load balancing application 104 keeps the number of TCBs allocated to the port unchanged (reference numeral 618). If the output of the machine learning module 106 is less than the number of TCBs allocated to the port (reference numeral 620), then the load balancing frees one or more allocated TCBs of the port to reduce the number of TCBs allocated to the port to be the number indicated by the output (reference numeral 622).

Figure 7:
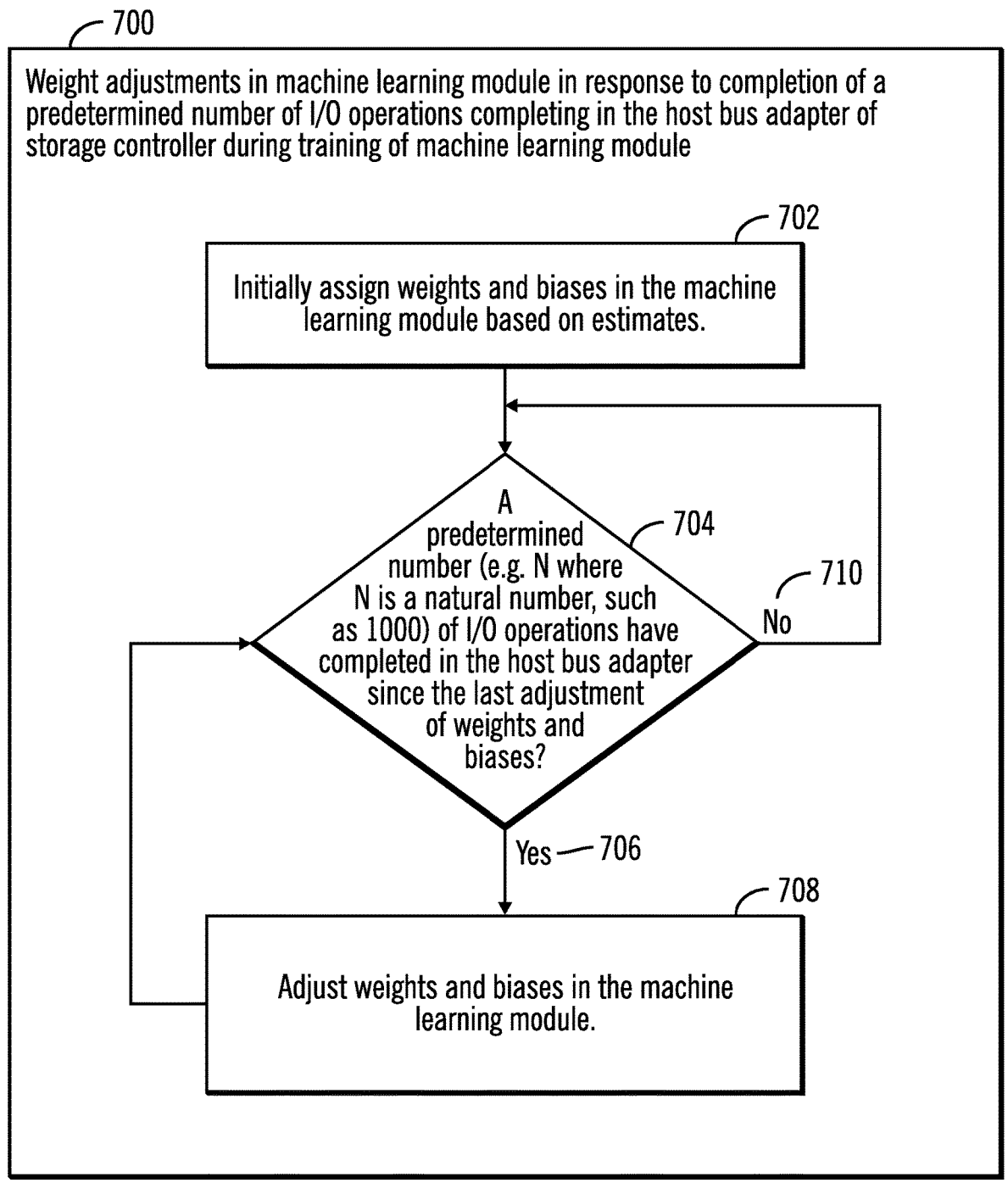
FIG. 7 illustrates a flowchart that shows how the weights and biases of the machine learning module are adjusted, in accordance with certain embodiments.

FIG. 7 illustrates a flowchart 700 that shows how the weights and biases of the machine learning module 106 are adjusted, in response to completion of a predetermined number of I/O operations completing in the host bus adapter 114 of storage controller 102 during training of the machine learning module 106, in accordance with certain embodiments.

Control starts at block 702 in which the load balancing application 104 initially assigns weights and biases in the machine learning module 106 based on estimates. A determination is made at block 704 as to whether a predetermined number (e.g. N where N is a natural number, such as 1000) of I/O operations have completed in the host bus adapter 114 since the last adjustment of weights and biases. If so ("Yes" branch 706), control proceeds to block 708 in which weights and biases are adjusted in the machine learning module 106 based on a margin of error computed from the deviation of a generated output of the machine learning module 106 from an expected output of the machine learning module 106, where the expected output may be computed by the load balancing application 104. This is referred to as training the machine learning module 106 by adjustment of weights and biases so that learning occurs in the machine learning module 106 to provide improved outputs in the future.

In FIG. 7, if at block 704 a determination is made that a predetermined number (e.g. N where N is a natural number, such as 1000) of I/O operations have not completed in the host bus adapter 114 since the last adjustment of weights and biases. ("No" branch 710) then control is maintained at block 704.

Figure 8:
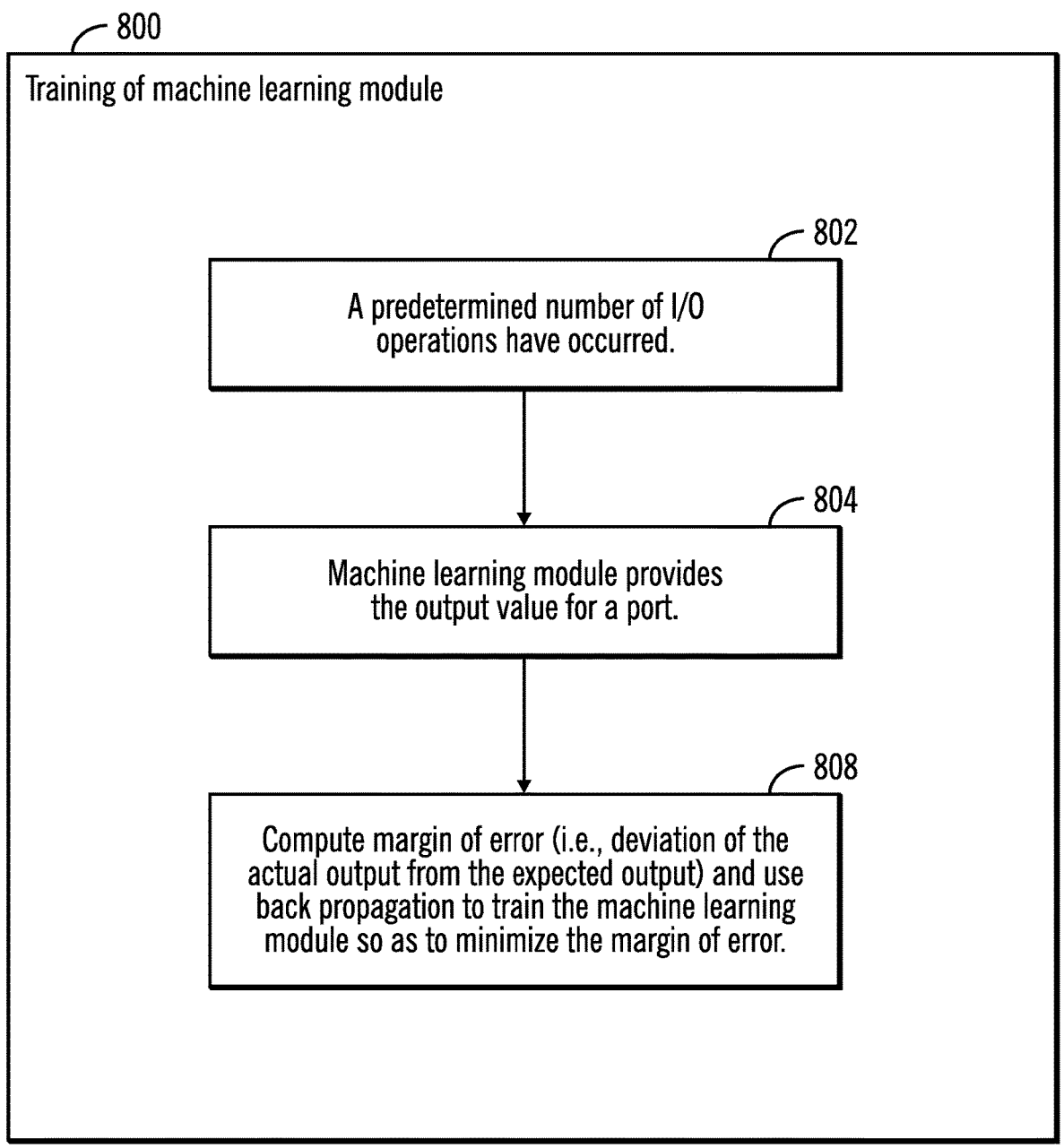
FIG. 8 illustrates a flowchart that shows a training of the machine learning module, in accordance with certain embodiments.

FIG. 8 illustrates a flowchart 800 that shows a training of the machine learning module 106, in accordance with certain embodiments.

Control starts at block 802 in which a predetermined number of I/O operations have occurred in a host bus adapter 114. The machine learning module 106 provides (at block 804) via forward propagation, the output value for a port of the host bus adapter. The margin of error is computed and back propagation is used (at block 808) to train the machine learning module 106. The margin of error is the deviation of the actual output from the expected output of the machine learning module 106, and the machine learning module 106 attempts to reduce the error while adjusting the weights and biases.

Figure 9:
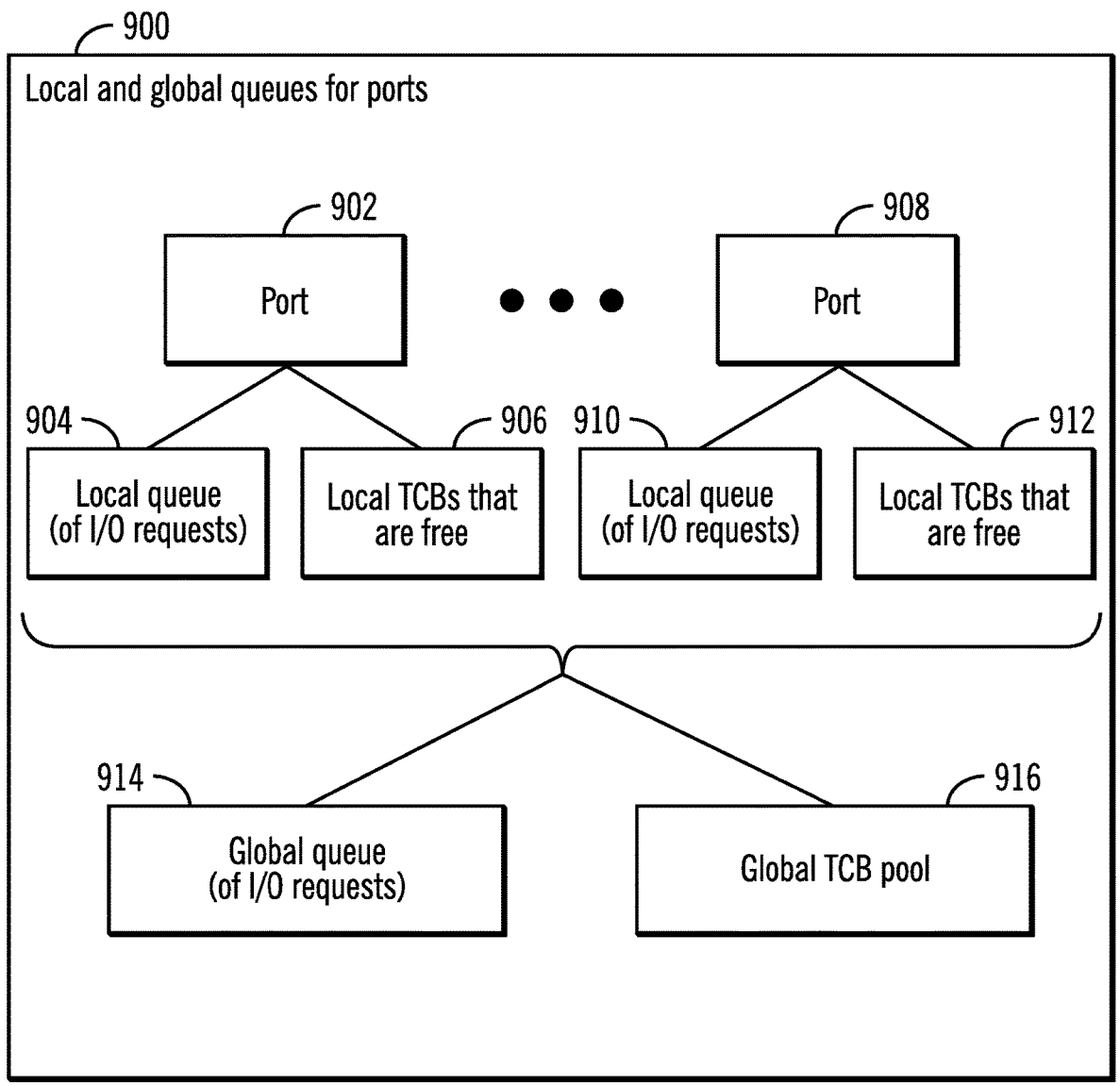
FIG. 9 illustrates a block diagram that shows local and global queues for interfaces, such as ports, in accordance with certain embodiments.

FIG. 9 illustrates a block diagram 900 that shows local and global queues for interfaces, such as ports, in accordance with certain embodiments.

Associated with each port 902, 908 is a local queue 904, 910 of I/O requests waiting to be processed by the port, and local TCBs 906, 912 that are free to be allocated to the port for processing of I/O requests.

A global queue 914 of I/O requests and a global TCB pool 916 are also maintained, where the I/O requests in the global queue 914 may be processed by any port of the host bus adapter 114, and the TCBs from the global TCB pool 916 may be allocated to the any port of the host bus adapter 114.

Figure 10:
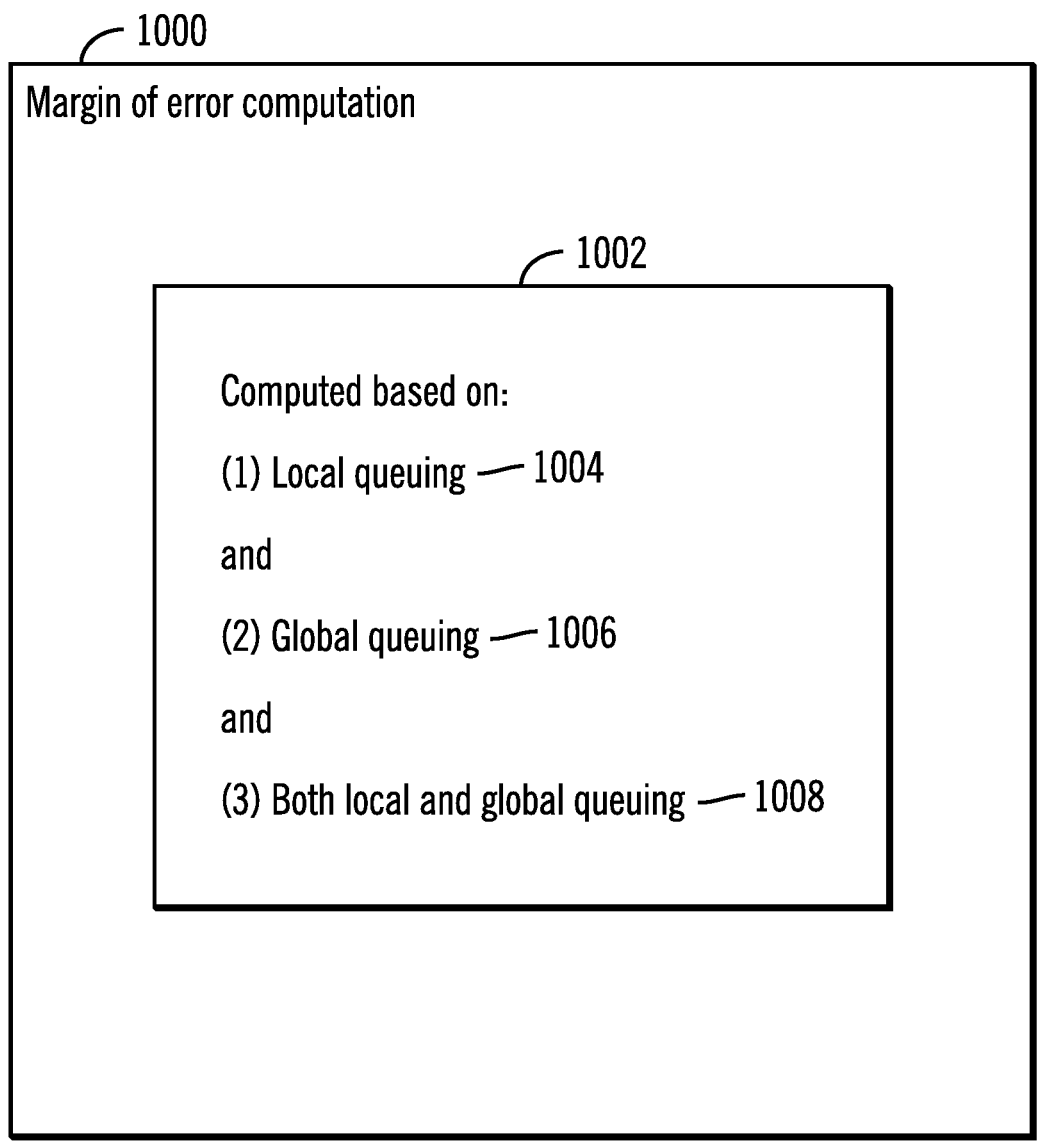
FIG. 10 illustrates a block diagram that shows how margin of error is computed based on local and global queuing, in accordance with certain embodiments

FIG. 10 illustrates a block diagram 1000 that shows how margin of error is computed based on local and global queuing, in accordance with certain embodiments. The margin of error may be computed 1002 based on local queuing 1004 or global queuing 1006 or by a combination of both local and global queuing 1008.

Figure 11:
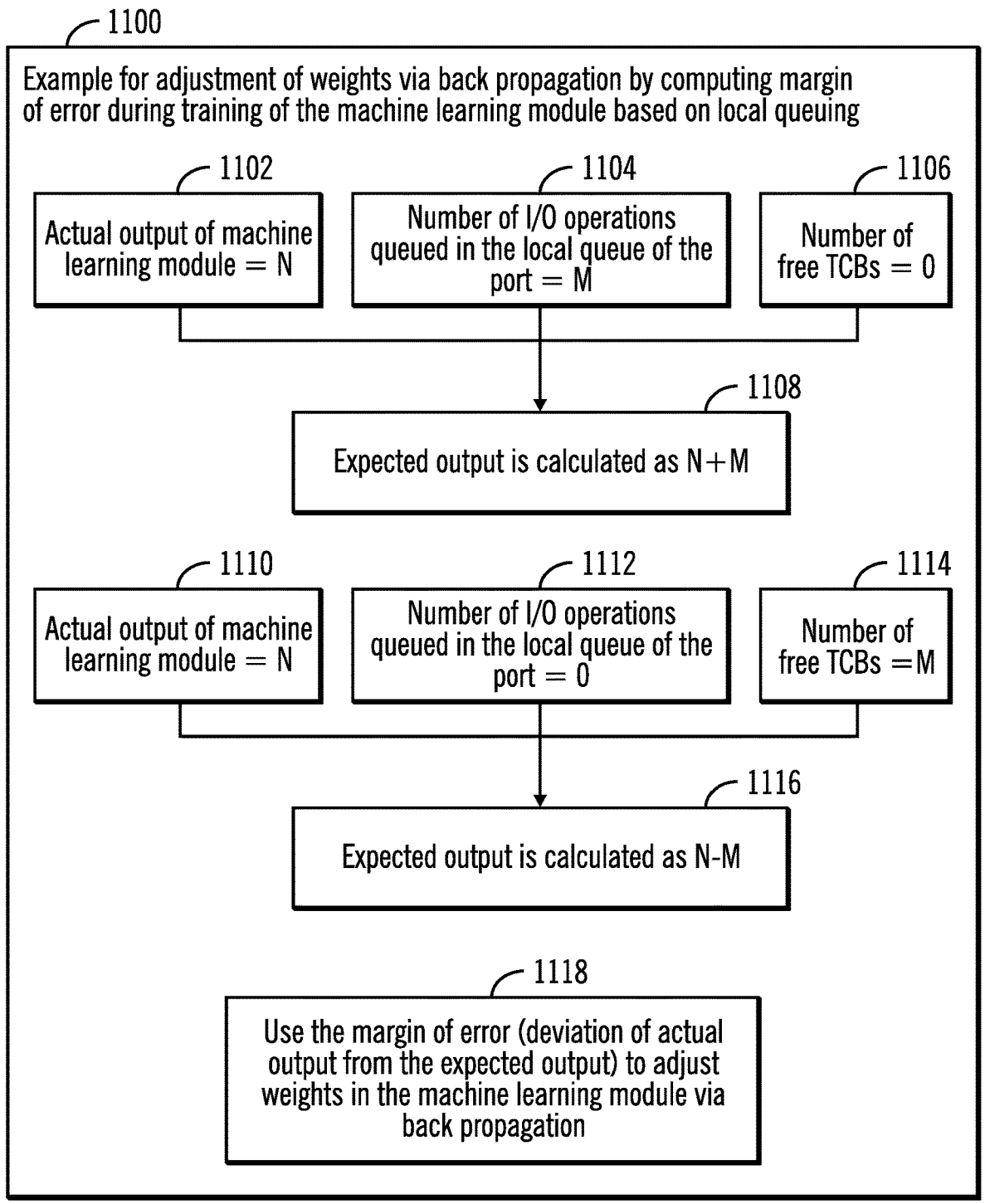
FIG. 11 illustrates a block diagram that shows an example for adjustment of weights via back propagation by computing a margin of error during training of the machine learning module based on local queuing, in accordance with certain embodiments.

FIG. 11 illustrates a block diagram 1100 that shows an example for adjustment of weights via back propagation by computing a margin of error during training of the machine learning module 106 based on local queuing 1004, in accordance with certain embodiments.

In FIG. 11, in one example, the following are the values of certain parameters:
(i) The actual output of the machine learning module=N (reference numeral 1102);
(ii) The number of I/O operations queued in the local queue of port=M (reference numeral 1104);
(iii) Number of free TCBs=0 (reference numeral 1106).

For this example, the expected output 1108 of the machine learning module 106 is calculated as N+M (as N+M allocated TCBs would remove the I/O operations from the local queue).

In FIG. 11, in another example, the following are the values of certain parameters:
(i) The actual output of the machine learning module=N (reference numeral 1110);
(ii) The number of I/O operations queued in the local queue of port=0 (reference numeral 1112);
(iii) Number of free TCBs=M (reference numeral 1114).

For this example, the expected output 1116 of the machine learning module 106 is calculated as N−M (as there are M excess TCBs in the local queue).

In the embodiments shown in FIG. 11, the margin of error is computed by calculating the deviation of the actual output from the expected output to adjust weights and biases in the machine learning module 106 via back propagation (reference numeral 1118).

Figure 12:
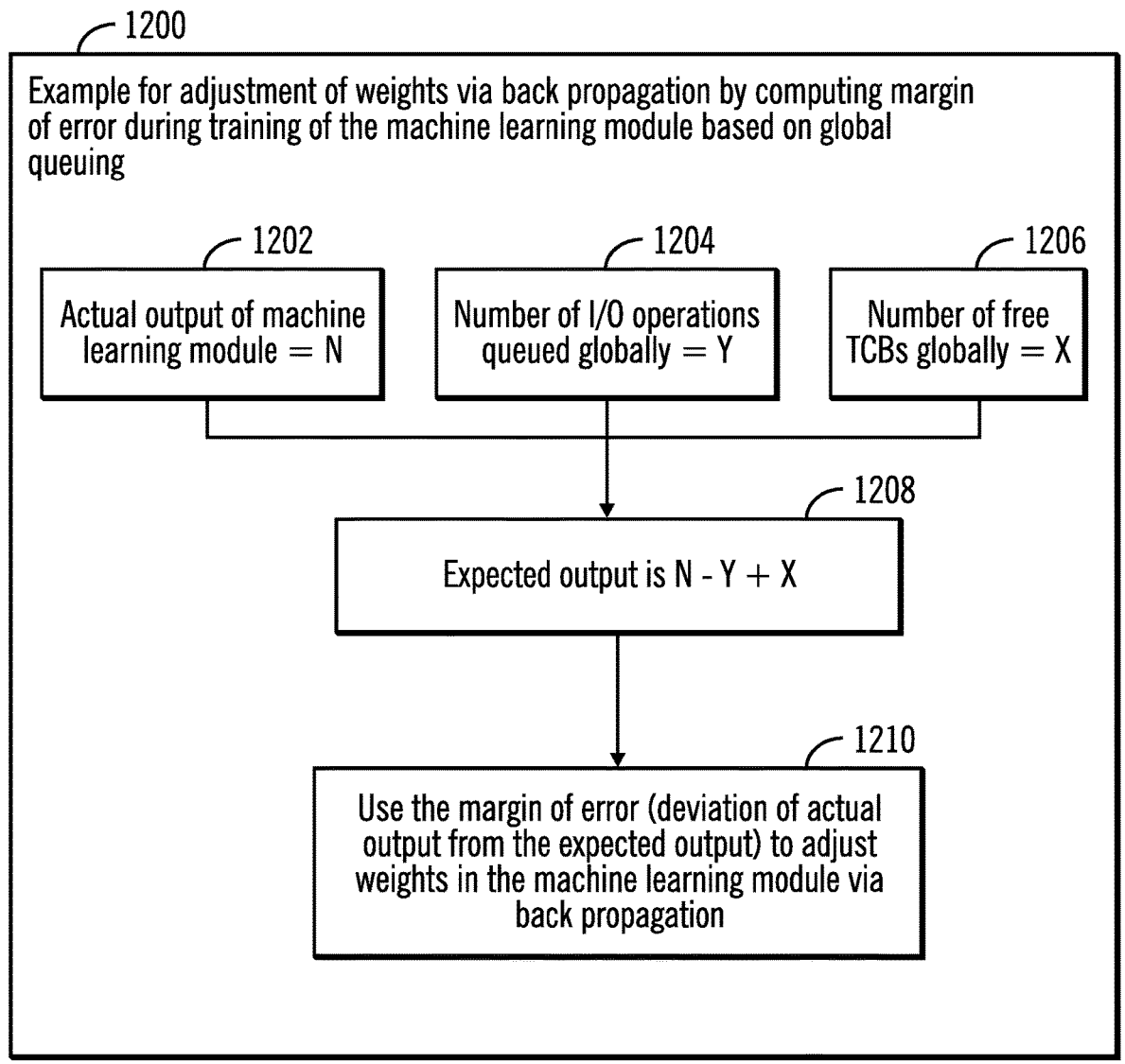
FIG. 12 illustrates a block diagram that shows an example for adjustment of weights via back propagation by computing a margin of error during training of the machine learning module based on global queuing, in accordance with certain embodiments.

FIG. 12 illustrates a block diagram 1200 that shows an example for adjustment of weights via back propagation by computing a margin of error during training of the machine learning module 106 based on global queuing 1008, in accordance with certain embodiments.

In FIG. 12, in one example, the following are the values of certain parameters:
(i) The actual output of the machine learning module=N (reference numeral 1202);
(ii) The number of I/O operations queued in a global queue=Y (reference numeral 1204);
(iii) Number of free TCBs in a global TCB pool=X. (reference numeral 1106).

For this example, the expected output 1208 of the machine learning module 106 is calculated as N−Y+X That is output should have been less for a port when more requests are queued globally and should have been more when less requests queued globally.

In the embodiments shown in FIG. 12, the margin of error is computed by calculating the deviation of the actual output 1202 from the expected output 1208 to adjust weights and biases in the machine learning module 106 via back propagation (reference numeral 1210).

Figure 13:
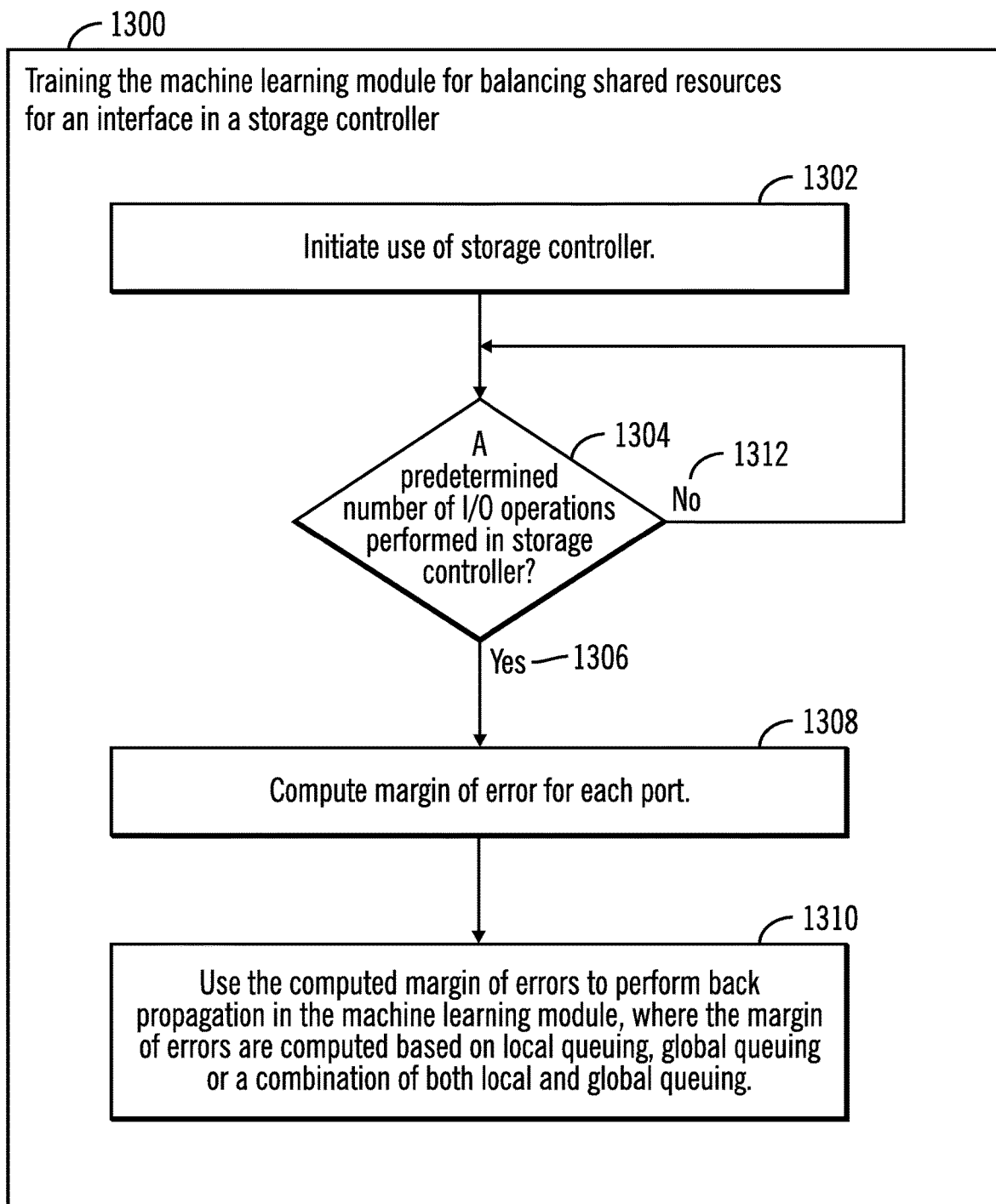
FIG. 13 illustrates a flowchart that shows a training of the machine learning module for balancing shared resources for an interface in a storage controller, in accordance with certain embodiments.

FIG. 13 illustrates a flowchart 1300 that shows a training of the machine learning module 106 for balancing shared resources for an interface in a storage controller, in accordance with certain embodiments;

Control starts at block 1302 in which the use of the storage controller 102 is initiated. The process determines whether a predetermined number of I/O operations have been performed in storage controller. If so ("Yes" branch 1306), then control proceeds to block 1308 in which the process computes the margin of error for each port, and the computed margin of errors are used to perform (at block 1310) back propagation in the machine learning module 106, where the margin of errors are computed based on local queuing, global queuing or a combination of both local and global queuing.

If at block 1304 the predetermined number of I/O operations have not been performed in the storage controller ("No branch 1312), then control returns again to block 1304.

Figure 14:
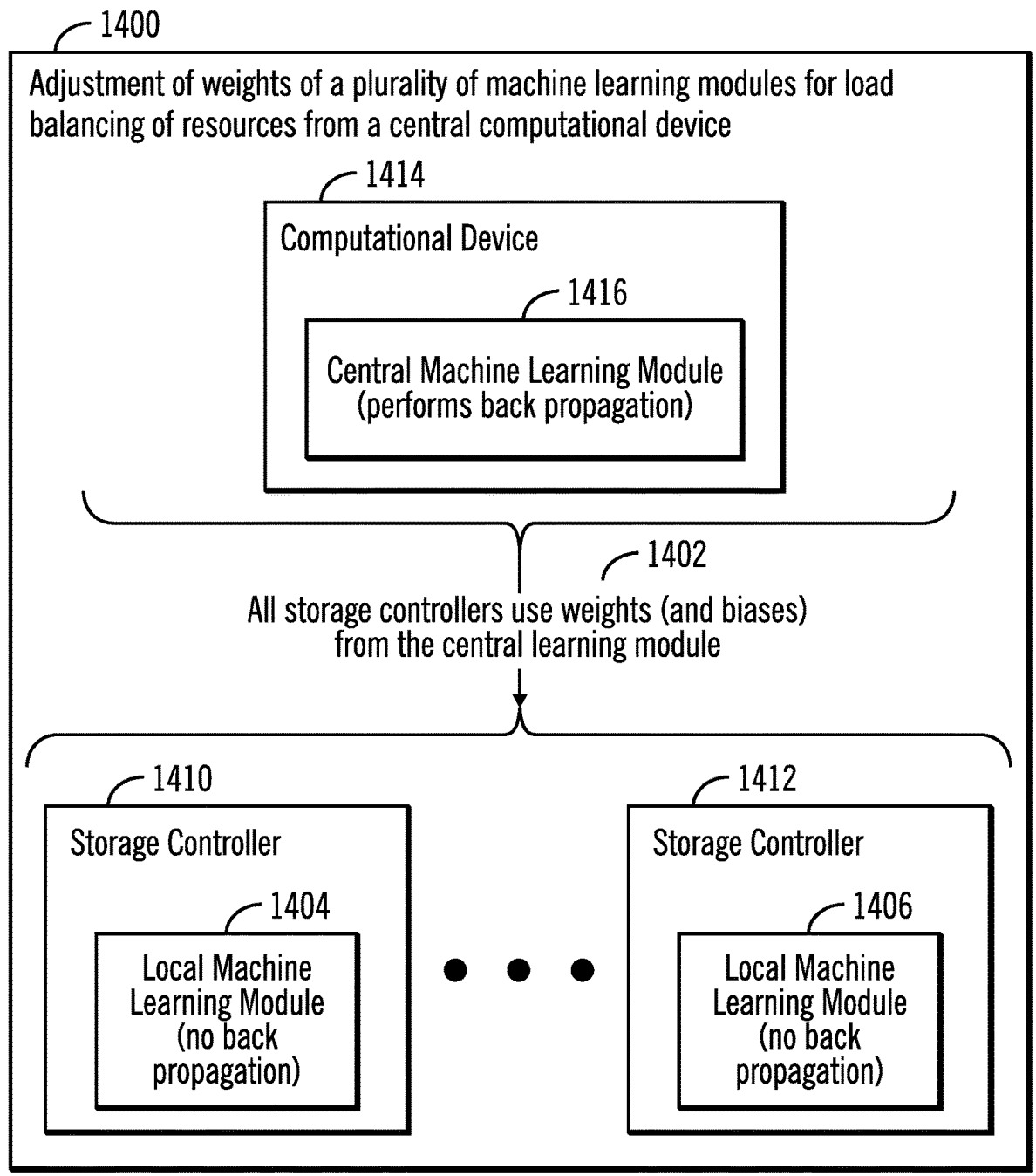
FIG. 14 illustrates a block diagram that shows the adjustment of weights of a plurality of machine learning modules from a central computational device, in accordance with certain embodiments.

FIG. 14 illustrates a block diagram 1400 that shows the adjustment of weights of a plurality of machine learning modules 1404, 1406 of a plurality of storage controller 1410, 1412 from a central computational device 1414 for load balancing of resources in a storage controller, in accordance with certain embodiments (as shown via reference numeral 1402). In certain embodiments, only the central machine learning module 1416 that executes in the central computational device 1414 performs back propagation and then shares the weight and bias changes with the local machine learning modules 1404, 1406 of the storage controllers 1410, 1412.

Figure 15:
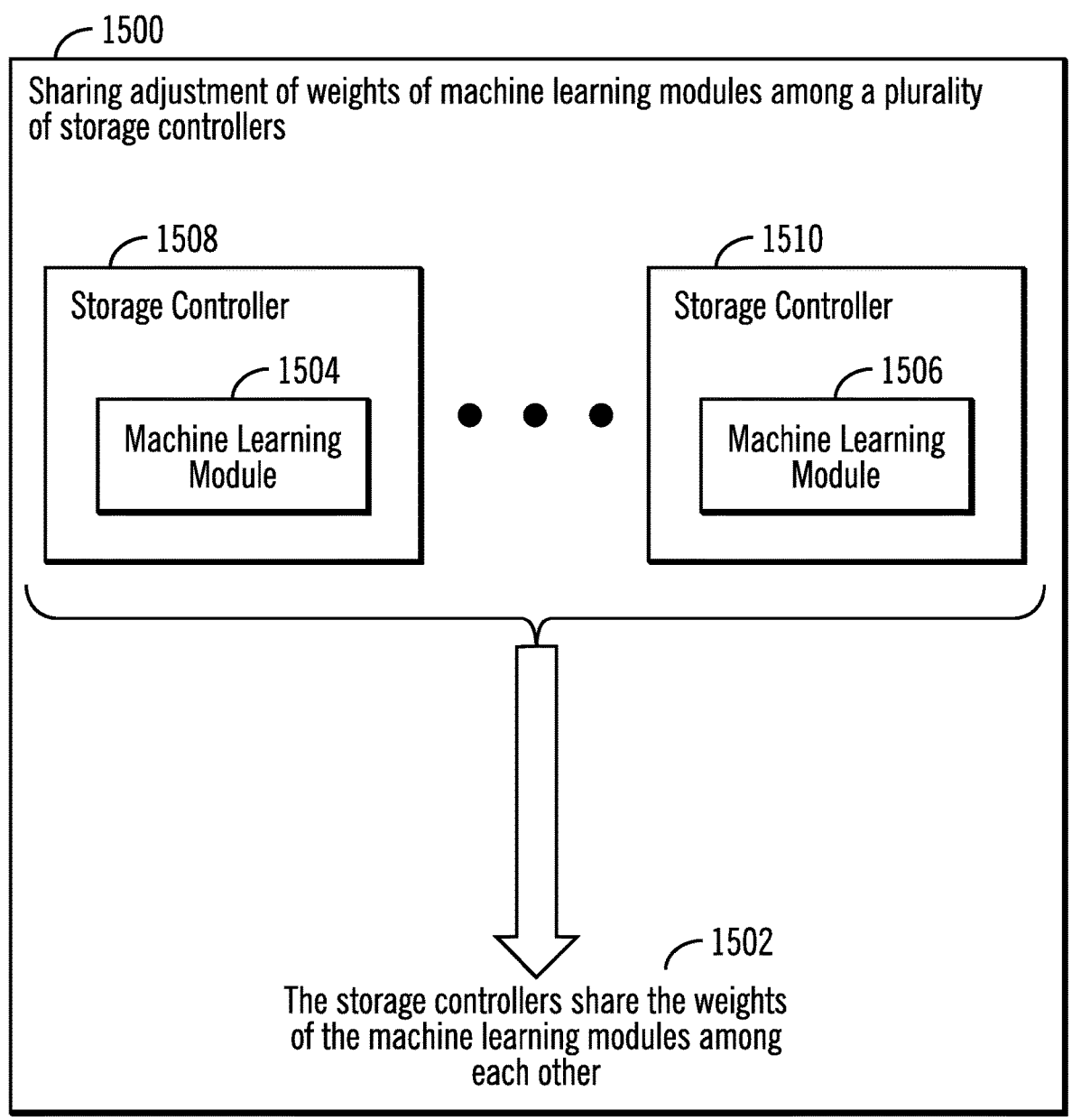
FIG. 15 illustrates a block diagram that shows the sharing of the adjustment of weights of machine learning modules among a plurality of storage controllers, in accordance with certain embodiments.

FIG. 15 illustrates a block diagram 1500 that shows the sharing (reference numeral 1502) of the adjustment of weights and biases of machine learning modules 1504, 1506 among a plurality of storage controllers 1508, 1510 for optimizing the allocation of resources among a plurality of interfaces, in accordance with certain embodiments. This is a form of peer to peer sharing of weights and biases among a plurality of storage controllers to collectively improve the training of a plurality of machine learning modules. In case the storage controllers 1508, 1510 are similar then such mechanisms may accelerate the process of training the machine learning modules 1504, 1506.

Figure 16:
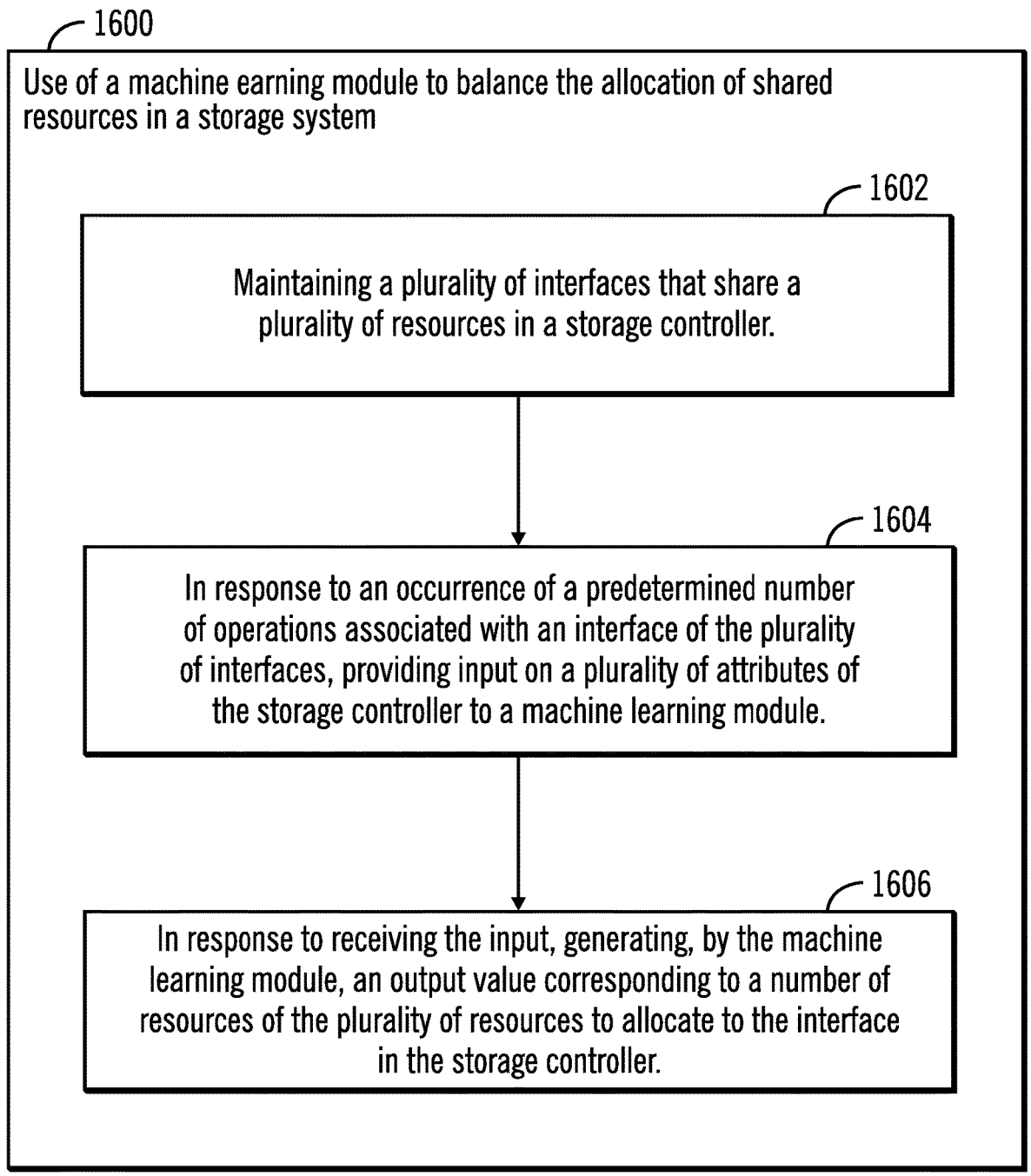
FIG. 16 illustrates a flowchart that shows the use of a machine learning module to balance the allocation of shared resources in a storage system, in accordance with certain embodiments.

FIG. 16 illustrates a flowchart 1600 that shows the use of a machine learning module 106 to balance the allocation of shared resources in a storage system 102, in accordance with certain embodiments.

Control starts at block 1602 in which a plurality of interfaces that share a plurality of resources in a storage controller 102 are maintained. In response to an occurrence of a predetermined number of operations associated with an interface of the plurality of interfaces, an input is provided (at block 1604) on a plurality of attributes of the storage controller 102 to a machine learning module 106. In response to receiving the input, the machine learning module 106 generates (at block 1606) an output value corresponding to a number of resources of the plurality of resources to allocate to the interface in the storage controller.

In certain embodiments shown in FIG. 16, the plurality of interfaces comprise a plurality of ports of a host bus adapter that communicatively couples the storage controller to a host computational device. The plurality of resources comprise a plurality of task control blocks for executing a plurality of input/output (I/O) operations that are received by the host bus adapter from the host computational device.

Figure 17:
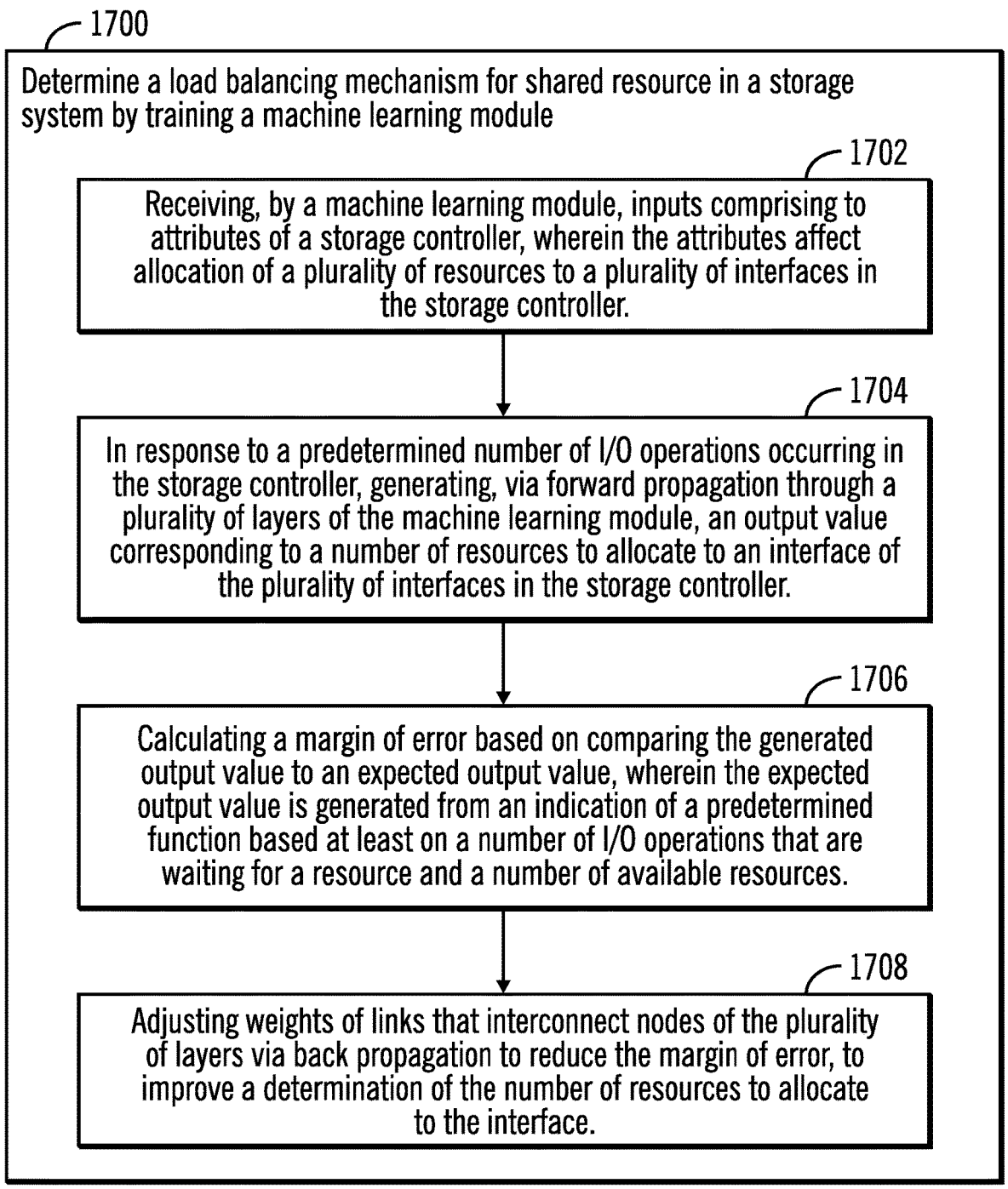
FIG. 17 illustrates a flowchart that shows a determination of load balancing mechanism for shared resource in a storage system by training a machine learning module, in accordance with certain embodiments.

FIG. 17 illustrates a flowchart that shows a determination of load balancing mechanism for shared resource in a storage system by training a machine learning module, in accordance with certain embodiments;

Control starts at block 1702 in which a machine learning module 106 receives inputs comprising attributes of a storage controller 102, wherein the attributes affect allocation of a plurality of resources to a plurality of interfaces in the storage controller. In response to a predetermined number of I/O operations occurring in the storage controller 102, a generation is made (at block 1704) via forward propagation through a plurality of layers of the machine learning module 106 of an output value corresponding to a number of resources to allocate to an interface of the plurality of interfaces in the storage controller 102.

From block 1704 control proceeds to block 1706 in which a margin of error is calculated based on comparing the generated output value to an expected output value, wherein the expected output value is generated from an indication of a predetermined function based at least on a number of I/O operations that are waiting for a resource and a number of available resources. Control proceeds to block 1708 in which an adjustment is made of weights of links that interconnect nodes of the plurality of layers via back propagation to reduce the margin of error, to improve a determination of the number of resources to allocate to the interface.

It should be noted that the margin of error for the machine learning module may be computed differently in different embodiments. In certain embodiments, the margin of error for training the machine learning module may be based on comparing the generated output value of the machine learning to an expected output value. Other embodiments may calculate the margin of error via different mechanisms. A plurality of margin of errors may be aggregated into a single margin of error and the single margin of error may be used to adjust weights and biases, or the machine learning module may adjust weights and biases based on a plurality of margin of errors.

Therefore, FIGS. 1-17 illustrate certain embodiments, in which a machine learning module 106 is used to determine balance a plurality of resources among a plurality of interfaces of a storage controller 102. Training mechanisms for the machine learning module are also discussed in FIGS. 1-17.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 18:
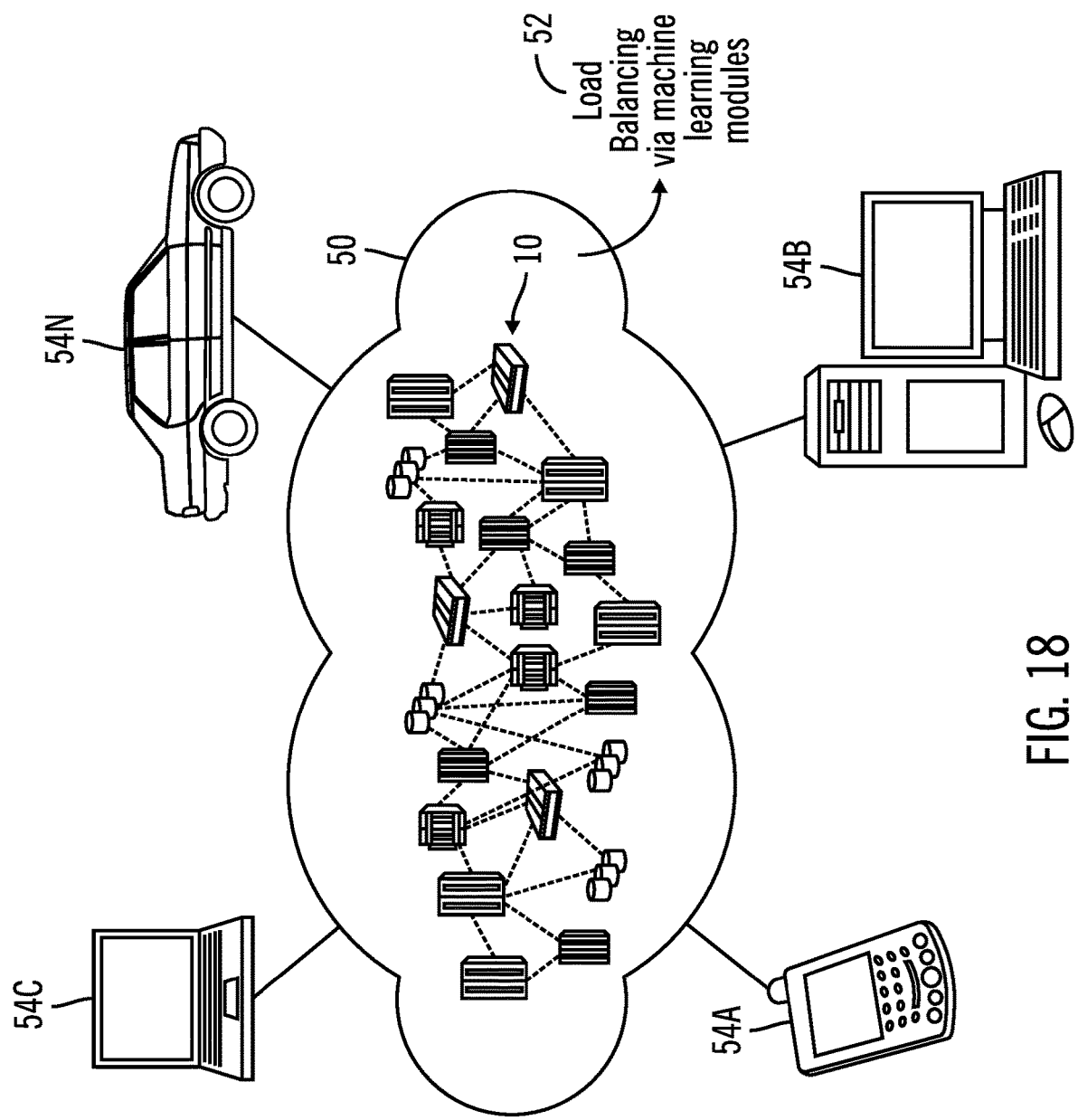
FIG. 18 illustrates a block diagram of a cloud computing environment for implementing the operations described in FIGS. 1-17, in accordance with certain embodiments.

Referring now to FIG. 18 an illustrative cloud computing environment 50 is depicted. Load balancing via machine learning modules (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

Figure 19:
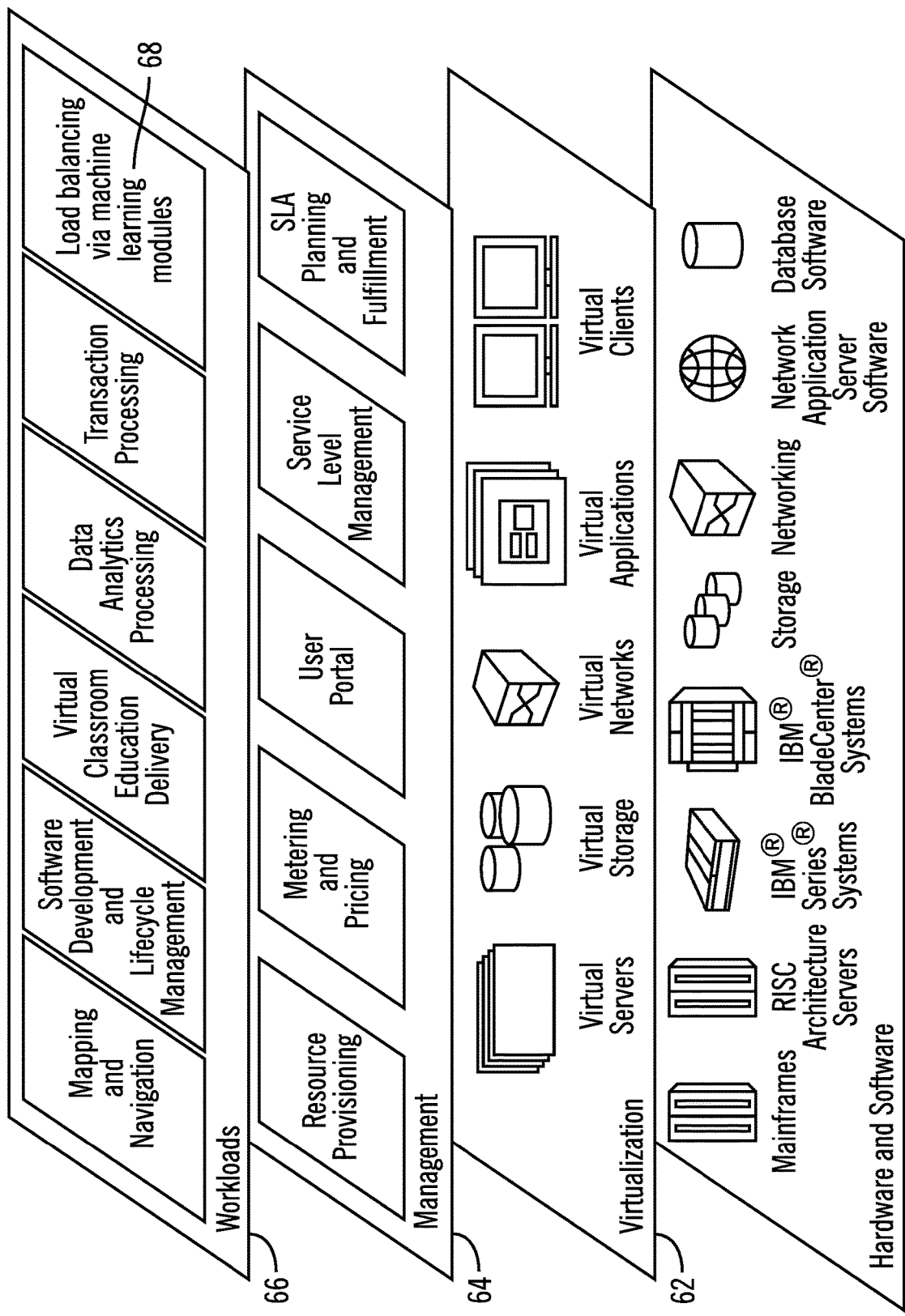
FIG. 19 illustrates a block diagram that shows further details of the cloud computing environment of FIG. 18 in accordance with certain embodiments.

Referring now to FIG. 19, a set of functional abstraction layers provided by cloud computing environment 50 (FIG. 18) is shown. It should be understood in advance that the components, layers, and functions shown in FIG. 17 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

* IBM, ZSERIES, PSERIES, XSERIES, BLADECENTER, WEBSPHERE, AND DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and load balancing via machine learning modules 68 as shown in FIGS. 1-19.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 20:
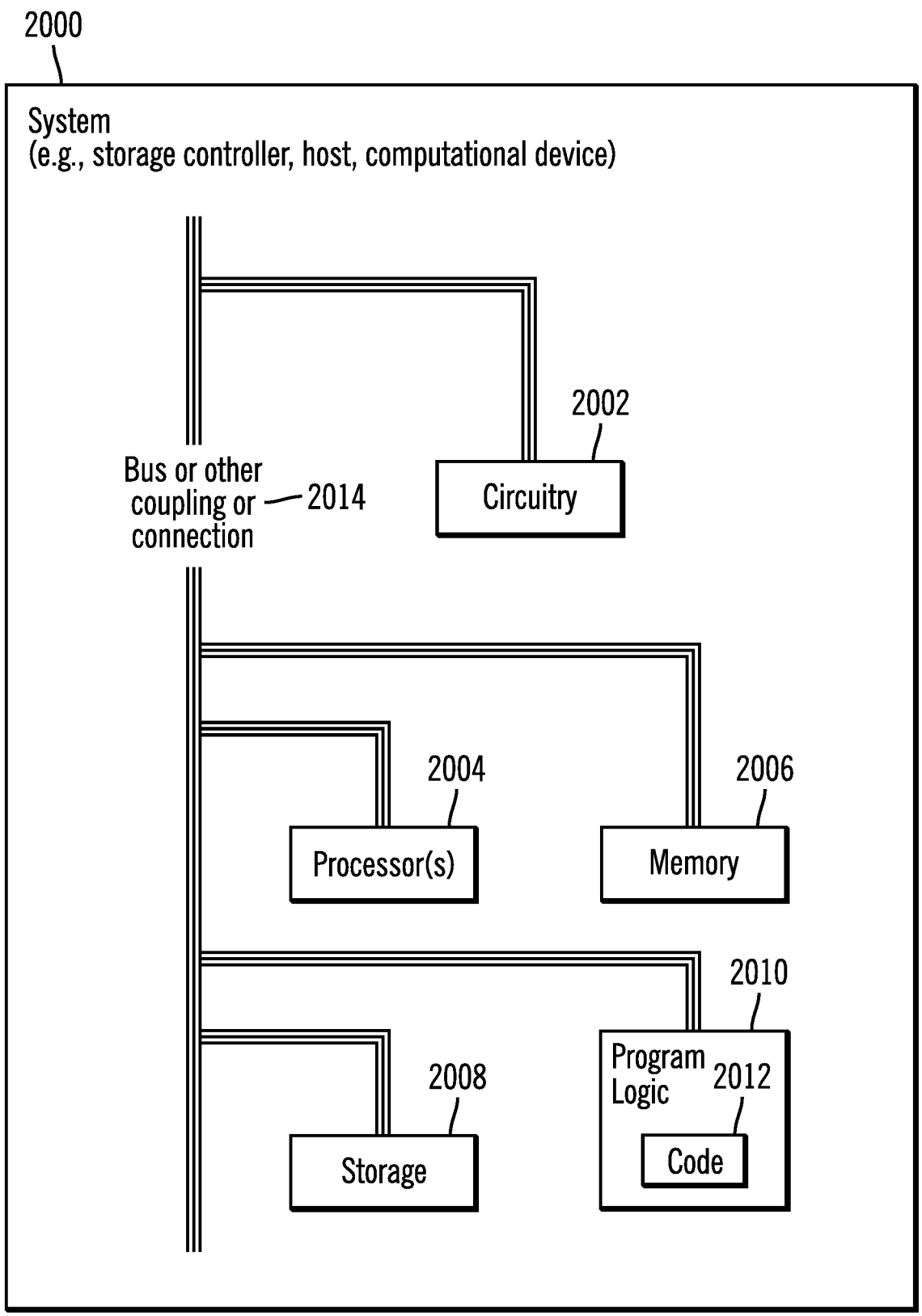
FIG. 20 illustrates a block diagram of a computational system, in accordance with certain embodiments.

FIG. 20 illustrates a block diagram that shows certain elements that may be included in the storage controller 102, or other computational devices 108 in accordance with certain embodiments. The system 2000 may include a circuitry 2002 that may in certain embodiments include at least a processor 2004. The system 2000 may also include a memory 2006 (e.g., a volatile memory device), and storage 2008. The storage 2008 may include a non-volatile memory device (e.g., EEPROM, ROM, PROM, flash, firmware, programmable logic, etc.), magnetic disk drive, optical disk drive, tape drive, etc. The storage 2008 may comprise an internal storage device, an attached storage device and/or a network accessible storage device. The system 2000 may include a program logic 2010 including code 2012 that may be loaded into the memory 2006 and executed by the processor 2004 or circuitry 2002. In certain embodiments, the program logic 2010 including code 2012 may be stored in the storage 2008. In certain other embodiments, the program logic 2010 may be implemented in the circuitry 2002. One or more of the components in the system 2000 may communicate via a bus or via other coupling or connection 2014. While FIG. 20 shows the program logic 2010 separately from the other elements, the program logic 2010 may be implemented in the memory 2006 and/or the circuitry 2002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving, by a machine learning module, inputs comprising attributes of a storage controller, wherein the attributes affect allocation of a plurality of resources to a plurality of interfaces of a host bus adapter in the storage controller;

in response to a predetermined number of I/O operations occurring in the storage controller, generating, via forward propagation through a plurality of layers of the machine learning module, an output value corresponding to a number of resources to allocate to an interface of the plurality of interfaces in the storage controller;

calculating a margin of error based on comparing the generated output value to an expected output value, wherein the expected output value is generated from an indication of a predetermined function based at least on a number of I/O operations that are waiting for a resource and a number of available resources; and adjusting weights of links that interconnect nodes of the plurality of layers via back propagation to reduce the margin of error, to improve a determination of the number of resources to allocate to the interface, wherein:

the plurality of interfaces comprise a plurality of ports of the host bus adapter that communicatively couples the storage controller to a host computational device; and the plurality of resources comprise a plurality of task control blocks (TCB) for executing a plurality of input/output (I/O) operations that are received by the host bus adapter from the host computational device, wherein the margin of error is computed by at least determining a number of I/O operations queued in a global queue and a number of free TCBs in a global TCB pool and the generated output value.

2. The method of claim 1, the method further comprising: improving over a period of time, the determination of the number of resources to allocate to the interface, by repeatedly adjusting the weights of the links via the back propagation, in response to an occurrence of the predetermined number of I/O operations subsequent to a previous adjustment of the weights of the links via back propagation.

3. The method of claim 1, wherein the interface is a port of the plurality of ports, and wherein:

if the output value is N, and if a number of I/O operations queued in a local queue of the port is M, and if a number of free TCBs local to the port is zero, then the expected output is N+M, wherein N and M are numbers.

4. The method of claim 1, wherein the interface is a port of the plurality of ports, and wherein:

if the output value is N, and if a number of I/O operations queued in a local queue of the port is zero, and the number of free TCBs local to the port is M, then the expected output is N−M, wherein N and M are numbers.

5. The method of claim 1, wherein the interface is a port of the plurality of ports, wherein the global queue is for the plurality of ports, and wherein:

if the output value is N, and if a number of I/O operations queued in the global queue for the plurality of ports is Y, and the number of free TCBs in the global TCB pool is X, then the expected output is N−Y+X, wherein N, Y and X are numbers.

6. The method of claim 1, wherein the plurality of attributes includes:

a measure of a total number of I/O operations currently active in the host bus adapter;

a measure of total number of I/O operations currently active on the port;

a measure of a total number of rejected I/O operations in the host bus adapter;

a measure of a total number of rejected I/O operations from the port;

a measure of an average response time for I/O operations;

a measure of a current queue length on the port;

a measure of a current number of dedicated TCBs on the port; and a measure of a current number of shared TCBs in the host bus adapter.

7. The method of claim 1, wherein the plurality of attributes includes:

a measure of a peak number of I/O operations in the host bus adapter;

a measure of an average number of I/O operations in the host bus adapter;

a measure of a median number of I/O operations in the host bus adapter;

a measure of a number of high priority I/O requests rejected from the host bus adapter, wherein high priority I/O requests are expected to be processed faster than low priority I/O requests;

a measure of a number of high priority requests active in the host bus adapter; and a measure of a number of connections from the host computational device to the host bus adapter.

8. The method of claim 1, wherein the machine learning module is a neural network, wherein the plurality of layers comprises:

an input layer that receives the inputs comprising the attributes of the storage controller;

one or more hidden layers; and an output layer that outputs the output value, the method further comprising:

assigning, initial weights in the neural network based on estimates; and adjusting the weights of the links in the neural network, during a training of the neural network, in response to a predetermined number of operations occurring in the storage controller.

9. The method of claim 1, wherein the machine learning module executes in a central computing device that generates weights to be applied to machine learning modules of a plurality of storage controllers in which a plurality of failures occur, and wherein the machine learning module executing in the central computing device receives information from the machine learning modules of the plurality of storage controllers.

10. A system, comprising:

a memory; and a processor coupled to the memory, wherein the processor performs operations, the operations comprising:

receiving, by a machine learning module, inputs comprising attributes of a storage controller, wherein the attributes affect allocation of a plurality of resources to a plurality of interfaces of a host bus adapter in the storage controller;

in response to a predetermined number of I/O operations occurring in the storage controller, generating, via forward propagation through a plurality of layers of the machine learning module, an output value corresponding to a number of resources to allocate to an interface of the plurality of interfaces in the storage controller;

calculating a margin of error based on comparing the generated output value to an expected output value, wherein the expected output value is generated from an indication of a predetermined function based at least on a number of I/O operations that are waiting for a resource and a number of available resources; and adjusting weights of links that interconnect nodes of the plurality of layers via back propagation to reduce the margin of error, to improve a determination of the number of resources to allocate to the interface, wherein:

the plurality of interfaces comprise a plurality of ports of the host bus adapter that communicatively couples the storage controller to a host computational device; and the plurality of resources comprise a plurality of task control blocks (TCB) for executing a plurality of input/output (I/O) operations that are received by the host bus adapter from the host computational device, wherein the margin of error is computed by at least determining a number of I/O operations queued in a global queue and a number of free TCBs in a global TCB pool and the generated output value.

11. The system of claim 10, the operations further comprising:
improving over a period of time, the determination of the number of resources to allocate to the interface, by repeatedly adjusting the weights of the links via the back propagation, in response to an occurrence of the predetermined number of I/O operations subsequent to a previous adjustment of the weights of the links via back propagation.

12. The system of claim 10, wherein the interface is a port of the plurality of ports, and wherein:
if the output value is N, and if a number of I/O operations queued in a local queue of the port is M, and if a number of free TCBs local to the port is zero, then the expected output is N+M, wherein N and M are numbers.

13. The system of claim 10, wherein the interface is a port of the plurality of ports, and wherein:
if the output value is N, and if a number of I/O operations queued in a local queue of the port is zero, and the number of free TCBs local to the port is M, then the expected output is N−M, wherein N and M are numbers.

14. The system of claim 10, wherein the interface is a port of the plurality of ports, wherein the global queue is for the plurality of ports, and wherein: if the output value is N, and if a number of I/O operations queued in the global queue for the plurality of ports is Y, and the number of free TCBs in the global TCB pool is X, then the expected output is N−Y+X, wherein N, Y and X are numbers.

15. A computer program product, the computer program product comprising a computer readable storage medium having computer readable program code embodied therewith, the computer readable program code configured to perform operations in a storage controller or a computational device, the operations comprising:
receiving, by a machine learning module, inputs comprising attributes of a storage controller, wherein the attributes affect allocation of a plurality of resources to a plurality of interfaces of a host bus adapter in the storage controller;
in response to a predetermined number of I/O operations occurring in the storage controller, generating, via forward propagation through a plurality of layers of the machine learning module, an output value corresponding to a number of resources to allocate to an interface of the plurality of interfaces in the storage controller;
calculating a margin of error based on comparing the generated output value to an expected output value, wherein the expected output value is generated from an indication of a predetermined function based at least on a number of I/O operations that are waiting for a resource and a number of available resources; and
adjusting weights of links that interconnect nodes of the plurality of layers via back propagation to reduce the margin of error, to improve a determination of the number of resources to allocate to the interface, wherein:
the plurality of interfaces comprise a plurality of ports of the host bus adapter that communicatively couples the storage controller to a host computational device; and
the plurality of resources comprise a plurality of task control blocks (TCB) for executing a plurality of input/output (I/O) operations that are received by the host bus adapter from the host computational device, wherein the margin of error is computed by at least determining a number of I/O operations queued in a global queue and a number of free TCBs in a global TCB pool and the generated output value.

16. The computer program product of claim 15, the operations further comprising:
improving over a period of time, the determination of the number of resources to allocate to the interface, by repeatedly adjusting the weights of the links via the back propagation, in response to an occurrence of the predetermined number of I/O operations subsequent to a previous adjustment of the weights of the links via back propagation.

17. The computer program product of claim 15, wherein the interface is a port of the plurality of ports, and wherein:
if the output value is N, and if a number of I/O operations queued in a local queue of the port is M, and if a number of free TCBs local to the port is zero, then the expected output is N+M, wherein N and M are numbers.

18. The computer program product of claim 15, wherein the interface is a port of the plurality of ports, and wherein:
if the output value is N, and if a number of I/O operations queued in a local queue of the port is zero, and the number of free TCBs local to the port is M, then the expected output is N−M, wherein N and M are numbers.

19. The computer program product of claim 15, wherein the interface is a port of the plurality of ports, wherein the global queue is for the plurality of ports, and wherein:
if the output value is N, and if a number of I/O operations queued in the global queue for the plurality of ports is Y, and the number of free TCBs in the global TCB pool is X, then the expected output is N−Y+X, wherein N, Y and X are numbers.

* * * * *